(12) United States Patent
Yeo et al.

(10) Patent No.: US 11,489,368 B2
(45) Date of Patent: Nov. 1, 2022

(54) ELECTRONIC DEVICE AND METHOD FOR WIRELESS CHARGING IN ELECTRONIC DEVICE

(71) Applicant: SAMSUNG ELECTRONICS CO., LTD., Suwon-si (KR)

(72) Inventors: Sung-Ku Yeo, Suwon-si (KR); Dong-Zo Kim, Yongin-si (KR); Bong-Chul Kim, Seoul (KR); Yu-Su Kim, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 98 days.

(21) Appl. No.: 16/545,025

(22) Filed: Aug. 20, 2019

(65) Prior Publication Data
US 2019/0379242 A1 Dec. 12, 2019

Related U.S. Application Data

(63) Continuation of application No. 15/346,857, filed on Nov. 9, 2016, now Pat. No. 10,461,583.

(30) Foreign Application Priority Data

Nov. 10, 2015 (KR) .................. 10-2015-0157756
Jun. 24, 2016 (KR) .................. 10-2016-0079387

(51) Int. Cl.
*H02J 50/12* (2016.01)
*G06F 1/26* (2006.01)
(Continued)

(52) U.S. Cl.
CPC ............... *H02J 50/12* (2016.02); *G06F 1/00* (2013.01); *G06F 1/26* (2013.01); *H02J 7/0077* (2013.01);
(Continued)

(58) Field of Classification Search
CPC .. H02J 50/12; H02J 50/80; H02J 50/40; H02J 50/60; H02J 50/10; H02J 7/004;
(Continued)

(56) References Cited

U.S. PATENT DOCUMENTS

2007/0103110 A1   5/2007   Sagoo
2011/0169446 A1   7/2011   Kondo
(Continued)

FOREIGN PATENT DOCUMENTS

JP        5347708 B2      11/2013
KR   10-2011-0110805 A   10/2011
(Continued)

OTHER PUBLICATIONS

Search Report dated Oct. 31, 2018 by the European Patent Office in counterpart European Patent Application No. 16864579.4.
(Continued)

*Primary Examiner* — Drew A Dunn
*Assistant Examiner* — Tarikh Kanem Rankine
(74) *Attorney, Agent, or Firm* — Sughrue Mion, PLLC

(57) ABSTRACT

An electronic device includes a controller to receive a signal from an external electronic device, and, based at least in part on the received signal, identify a wireless power scheme among at least two wireless power schemes. During the transmission mode, the controller controls the full bridge circuit to convert DC power to AC power based on a wireless power frequency corresponding to the identified wireless power scheme by controlling at least one transistor of the full bridge circuit, and controls to wirelessly transmit power based on the AC power to the external electronic device. During the reception mode, the controller controls to receive power from the external electronic device, controls the full bridge circuit to convert the received power to DC power by controlling transistors of the full bridge circuit,
(Continued)

and controls to provide the converted DC power for the battery of the electronic device.

13 Claims, 17 Drawing Sheets

(51) Int. Cl.
    *G06F 1/00* (2006.01)
    *H02J 50/60* (2016.01)
    *H02J 7/00* (2006.01)
    *H02J 50/10* (2016.01)
    *H02J 50/80* (2016.01)
    *H02J 7/02* (2016.01)

(52) U.S. Cl.
    CPC .............. *H02J 7/025* (2013.01); *H02J 50/10* (2016.02); *H02J 50/60* (2016.02); *H02J 50/80* (2016.02)

(58) Field of Classification Search
    CPC ...... H02J 7/025; B60L 53/122; B60L 53/124; B60L 53/126; B60L 53/34; B60L 53/35; B60L 53/36
    USPC .......................................................... 320/108
    See application file for complete search history.

(56) References Cited

U.S. PATENT DOCUMENTS

| | | | |
|---|---|---|---|
| 2011/0221390 A1 | 9/2011 | Won et al. | |
| 2011/0241616 A1* | 10/2011 | Kim ......................... | H02J 50/80 320/108 |
| 2011/0254377 A1* | 10/2011 | Wildmer ................. | H02J 50/10 307/104 |
| 2011/0261591 A1 | 10/2011 | Krause | |
| 2012/0013295 A1 | 1/2012 | Yeh | |
| 2013/0026981 A1* | 1/2013 | Van Der Lee ....... | H04B 5/0075 320/108 |
| 2013/0181665 A1* | 7/2013 | Lee ......................... | H02J 7/007 320/108 |
| 2014/0070624 A1 | 3/2014 | Kim et al. | |
| 2014/0191713 A1 | 7/2014 | Hong et al. | |
| 2014/0210406 A1 | 7/2014 | Na et al. | |
| 2014/0210506 A1 | 7/2014 | Wu et al. | |
| 2015/0061404 A1 | 3/2015 | Lamenza et al. | |
| 2015/0061586 A1* | 3/2015 | Cheikh ................... | H02J 50/10 320/108 |
| 2015/0137749 A1 | 5/2015 | Park | |
| 2015/0180284 A1 | 6/2015 | Kang et al. | |
| 2015/0215006 A1 | 7/2015 | Mehas et al. | |
| 2015/0244176 A1* | 8/2015 | Van Den Brink ... | H04B 5/0037 307/104 |
| 2015/0263535 A1 | 9/2015 | Bae | |
| 2015/0365135 A1* | 12/2015 | Miller .................. | A61B 5/0015 307/104 |
| 2015/0365137 A1* | 12/2015 | Miller ................... | H02J 7/0047 307/104 |
| 2016/0094048 A1* | 3/2016 | Bae ......................... | H02J 7/007 307/104 |
| 2016/0254705 A1* | 9/2016 | Jung ....................... | H02J 50/10 307/104 |
| 2017/0353055 A1* | 12/2017 | Han ........................ | H02J 7/025 |

FOREIGN PATENT DOCUMENTS

| | | |
|---|---|---|
| KR | 10-2013-0014156 A | 2/2013 |
| KR | 10-2014-0031709 A | 3/2014 |
| KR | 10-2014-0053758 A | 5/2014 |
| KR | 10-2014-0123811 A | 10/2014 |
| KR | 10-2015-0048013 A | 5/2015 |
| KR | 10-2015-0057783 A | 5/2015 |
| WO | 2015/064815 A1 | 5/2015 |

OTHER PUBLICATIONS

International Search Report and Written Opinion for Application No. PCT/KR2016/012940 dated Feb. 14, 2017 (9 pages).
Communication dated Sep. 20, 2019, issued by the European Patent Office in counterpart European Application No. 19178179.8.
Communication dated Aug. 26, 2019, issued by the European Patent Office in counterpart European Application No. 16 864 579.4.
Communication dated Jul. 24, 2020 by the European Patent Office in counterpart European patent Application No. 19178179.8.

* cited by examiner

ELECTRONIC DEVICE AND METHOD FOR WIRELESS CHARGING IN ELECTRONIC DEVICE

CROSS-REFERENCE TO RELATED APPLICATION(S)

This is a continuation of U.S. application Ser. No. 15/346,857 filed Nov. 9, 2016, which claims the priority under 35 U.S.C. § 119(a) from Korean Patent Application Nos. 10-2015-0157756, filed in the Korean Intellectual Property Office Nov. 10, 2015, and 10-2016-0079387, filed in the Korean Intellectual Property Office Jun. 24, 2016. The contents of the above-listed applications are incorporated by reference herein in their entireties.

BACKGROUND

Various embodiments of the present disclosure relate to an electronic device and a method for wireless charging in the electronic device.

A mobile terminal, such as a portable phone or a PDA (Personal Digital Assistant), uses rechargeable battery. In order to charge such a battery, electric energy is supplied by a separate charging device that plugs into the mobile device, or otherwise mates the contact terminals of the mobile device to contact terminals of the charging device. However, this type of charging scheme exposes the contact terminals on the mobile device and/or the charging device to the environment. Accordingly, the contact terminals may get contaminated by foreign matter, thereby interfering with charging the battery. Additionally, the exposed contact terminals on the mobile device may make it harder to make the mobile device water resistant.

Wireless charging, or contactless charging, technology has been developed and used for a number of electronic devices. Such wireless charging technology uses wireless power transmission and reception. The wireless charging technology allows a battery to be charged by merely putting a mobile device, such as a cell phone, on a charging pad without connecting the portable phone to a separate charging device. Wireless charging technology is used for many devices currently, including for wireless electric toothbrushes and wireless electric shavers. It is expected that wireless charging technology will advance significantly as electric cars become more common.

Presently, main interests in wireless charging technology have been with the inductive coupling scheme, the resonance inductive coupling scheme, and the radio wave (e.g., RF/microwave) radiation scheme. Up to the present, the inductive coupling scheme has been used for the most part. When power is transferred by the inductive coupling scheme, referred to in this disclosure as the induction scheme, current in a primary coil generates a magnetic field, and that magnetic field induces current in a secondary coil. Power transmission using inductive coupling has excellent energy transmission efficiency. However, the primary and secondary coils must be very close to each other for efficient energy transfer.

The resonance inductive coupling scheme, referred to in this disclosure as the resonance scheme, is a type of inductive coupling scheme where both the transmitter and the receiver have circuits tuned to a specific frequency. Professor Soljacic at MIT demonstrated this wireless charging system in 2005 by transferring power to an electronic device several meters away using Coupled Mode Theory. The resonance scheme uses the concept of resonance frequency, where resonance frequency is a characteristic of all objects. An object may preferentially generate or receive energy at its resonance frequency. For example, when a tuning fork is struck, it will vibrate at its resonance frequency. A wine glass near the turning fork with the same resonance frequency will absorb the acoustic energy of the vibrations generated by the tuning fork until the wine glass shatters. Similarly, a power transmitter using the resonance scheme generates a magnetic field of a specific frequency. Energy is transferred via that magnetic field only when there is a receiving device with receiving circuitry that has that resonance frequency. Due to larger distances between the transmitting device and the receiving device, the resonance scheme may have lower energy transmission efficiency than the induction scheme.

In recent years, however, experiments for wirelessly transmitting power from several tens of meters using microwave have been successful at home and abroad. Thus, it is expected that in the near future, all the electronic products can be wirelessly charged without wires anywhere anytime.

Various wireless charging standards have been proposed by Alliance for Wireless Power (A4WP) for the resonance scheme, Wireless Power Consortium (WPC) for the induction scheme, and Power Matters Alliance (PMA) for the resonance scheme and the induction scheme. If different products are released using different standards, it may become inconvenient for the user with respect to usability and compatibility.

Accordingly, in order for one electronic device to support the functions of a plurality of standards, a variety of additional elements may be required, or parallel configurations may need to be made to support the respective standards.

Furthermore, in an electronic device providing wireless charging, the circuits or systems constituting a transmitter and a receiver are different from each other. Thus, if the transmitter and the receiver are implemented together in an electronic device, a transmitter and a receiver may need to be provided for each standard that is supported.

The above information is presented as background information only to assist with an understanding of the present disclosure. No determination has been made, and no assertion is made, as to whether any of the above might be applicable as prior art with regard to the present disclosure.

SUMMARY

An aspect of various embodiments of the present disclosure is to provide an electronic device and a method for wireless charging in the electronic device, capable of allowing one circuit to support functions of both a transmitter and a receiver.

Another aspect of various embodiments of the present disclosure is to provide an electronic device and a method for wireless charging in the electronic device, capable of allowing one circuit to provide a plurality of wireless charging standards.

In accordance with an aspect of the present disclosure, there is provided an electronic device that includes a power supply configured to supply direct current (DC) power, and a controller configured to: determine a wireless power transmission mode or a wireless power reception mode if an external electronic device is detected, and output a first control signal corresponding to a wireless power transmission frequency supported by the external electronic device from among a plurality of wireless power transmission frequencies if the wireless power transmission mode is determined. The electronic device may also include a conversion circuit configured to convert the DC power supplied by the power supply to alternating current (AC) power in response to the first control signal and a wireless power transceiver configured to transmit the AC power from the conversion circuit.

In accordance with another aspect of the present disclosure, there is provided a method for wireless charging in an electronic device. The method includes determining a wireless power transmission mode or a wireless power reception mode if an external electronic device is detected, determining a wireless power transmission frequency supported by the external electronic device from among a plurality of wireless power transmission frequencies if the wireless power transmission mode is determined, converting direct current (DC) power to alternating current (AC) power based on a control signal corresponding to the wireless power transmission frequency, and transmitting the AC power.

Other aspects, advantages, and salient features of the disclosure will become apparent to those skilled in the art from the following detailed description, which, taken in conjunction with the annexed drawings, discloses some of the various embodiments of the disclosure.

BRIEF DESCRIPTION OF THE DRAWINGS

The above and other aspects, features and advantages of certain exemplary embodiments of the present disclosure will be more apparent from the following description taken in conjunction with the accompanying drawings, in which.

Throughout the drawings, like reference numerals will be understood to refer to like parts, components, and/or structures.

DETAILED DESCRIPTION

Figure 1:
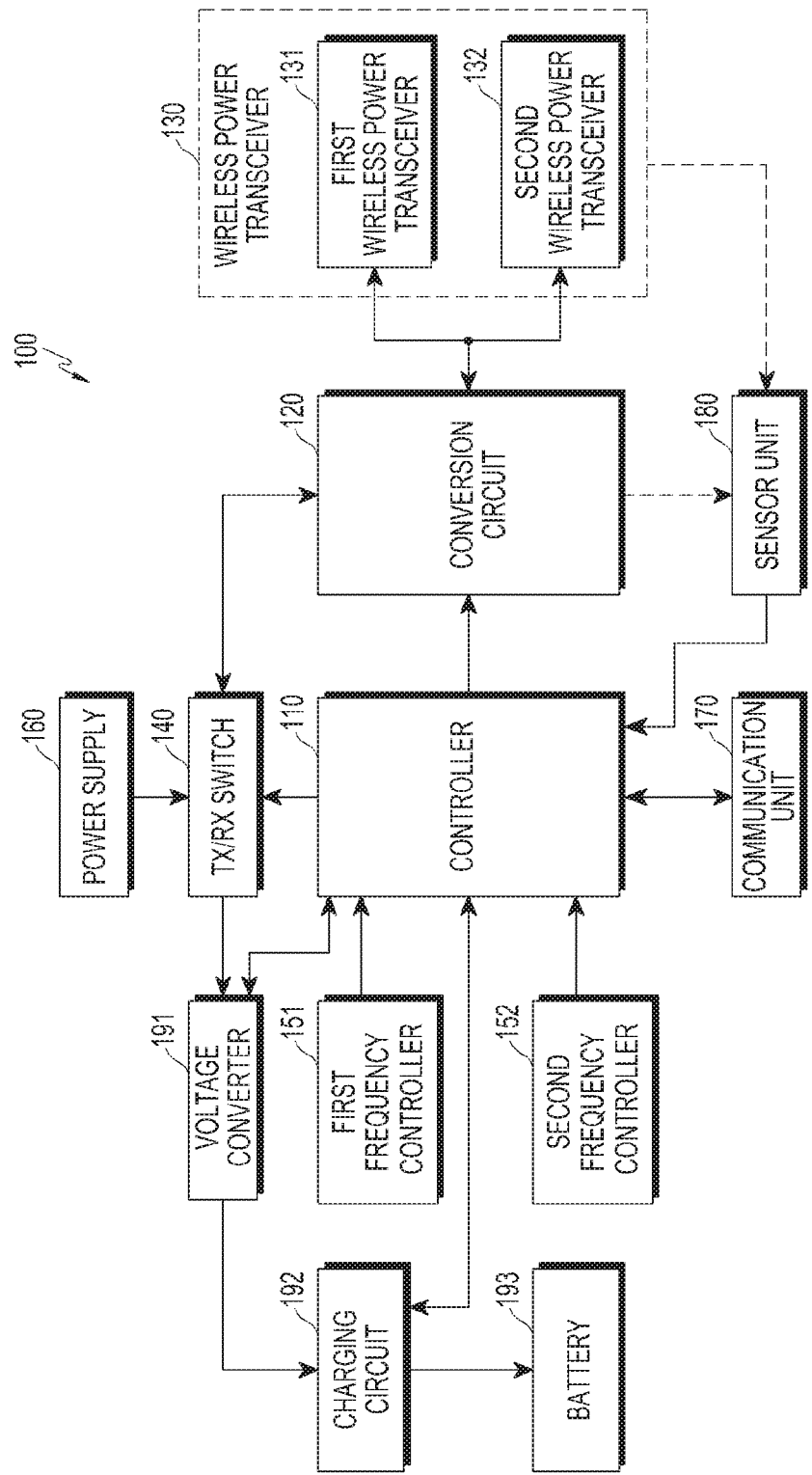
FIG. 1 is a block diagram illustrating a configuration of an electronic device according to various embodiments of the present disclosure.

Various embodiments of the present disclosure will be disclosed with reference to the accompanying drawings. However, the present disclosure is not intended to limit the present disclosure to particular embodiments, and it should be construed as including various modifications, equivalents, and/or alternatives according to various embodiments of the present disclosure. In regard to the description of the drawings, like reference numerals refer to like elements.

In the present disclosure, an expression such as "having," "may have," "comprising," or "may comprise" indicates existence of a corresponding characteristic (e.g., a numerical value, function, operation, or component) and does not exclude existence of additional characteristic. When used in a description of the present disclosure and the appended claims, a singular form may include a plurality of forms unless it is explicitly differently represented.

In the present disclosure, an expression such as "A and/or B" may include all possible combinations of the listed items. For example, "A and/or B" may indicate (1) including at least one A, (2) including at least one B, or (3) including both at least one A and at least one B.

Expressions such as "first," "second," "primarily," or "secondary," used in various exemplary embodiments may represent various elements regardless of order and/or importance and do not limit corresponding elements. The expressions may be used for distinguishing one element from another element. For example, a first user device and a second user device may represent different user devices regardless of order or importance. Accordingly, a first element may be referred to as a second element without deviating from the scope of the present disclosure, and similarly, a second element may be referred to as a first element.

When it is described that a first element is operatively or communicatively coupled/connected to a second element, the first element can be directly connected to the second element with no intermediate element in between or the first element can be connected to the second element via one or more elements. However, when it is described that a first element is directly connected/coupled to a second element, it means that there is no intermediate element between the first element and the second element.

The expression "configured to" used in the present disclosure may be replaced with, for example, "suitable for," "having the capacity to," "designed to," "adapted to," "made to," or "capable of" according to a situation. The expression "configured to" does not always mean only "specifically designed to" by hardware. Alternatively, in some situation, the expression "apparatus configured to" may mean that the apparatus can operate together with another apparatus or component. For example, the phrase "a processor configured to perform A, B, and C" may be referring to a genericpurpose processor (such as a CPU or an application processor) that can perform a corresponding operation by executing at least one software program for performing a corresponding operation, where the software program is stored at an exclusive processor (such as an embedded processor) or at a memory device.

Terms defined in the present disclosure are used only for describing a specific exemplary embodiment and do not necessarily limit the scope of other exemplary embodiments. All terms including technical terms and scientific terms used here have the same meaning as generally understood by a person of ordinary skill in the art. Terms defined in a dictionary should be used in context of the related technology and should not be analyzed to have an ideal or excessively formal meaning unless explicitly defined as such. Terms defined in the present disclosure should not be analyzed to exclude the present exemplary embodiments.

An electronic device according to various embodiments of the present disclosure may be, for example, a smart phone, a tablet personal computer (PC), a mobile phone, a video phone, an e-book reader, a desktop PC, a laptop PC, a netbook computer, a workstation, a server, a personal digital assistant (PDA), a portable multimedia player (PMP), an MP3 player, a mobile medical device, a camera, or a wearable device (e.g., smart glasses, a head mounted device (HMD), electronic clothing, an electronic bracelet, an electronic necklace, an electronic App accessory (or appcessory), electronic tattoo, a smart mirror, or a smart watch).

In some embodiments, the electronic device may be a smart home appliance. The smart home appliance may be, for example, a television (TV), a digital video disk (DVD) player, an audio player, a refrigerator, an air conditioner, a cleaner, an oven, a microwave oven, a washer, an air purifier, a set-top box, a home automation control panel, a security control panel, a TV box (e.g., a Samsung HomeSync™, an Apple TV™, or a Google TV™), a game console (e.g., Xbox™ or PlayStation™), an electronic dictionary, an electronic key, a camcorder or a digital photo frame.

In another embodiment, the electronic device may be one of various medical devices (e.g., various portable medical meters such as a blood glucose meter, a heart rate meter, a blood pressure meter, a temperature meter or the like), magnetic resonance angiography (MRA) machine, magnetic resonance imaging (MRI) machine, computed tomography (CT) machine, a medical camcorder, an ultrasonic device or the like), a navigation device, a global positioning system (GPS) receiver, an event data recorder (EDR), a flight data recorder (FDR), an automotive infotainment device, a marine electronic device (e.g., a marine navigation device, a gyro compass or the like), avionics, a security device, a car head unit, an industrial or home robot, an automatic teller machine (ATM) for banks, point of sales (POS) for shops, or an internet of things (IoT) device (e.g., an electric bulb, various sensors, an electricity or gas meter, a sprinkler device, a fire alarm, a thermostat, a streetlamp, a toaster, fitness equipment, a hot water tank, a heater, a boiler or the like).

In some embodiments, the electronic device may be a part of the furniture or building/structure, an electronic board, an electronic signature receiving device, a projector, or various meters (e.g., meters for water, electricity, or gas). In various embodiments, the electronic device may be one or a combination of the above-described devices. An electronic device according to some embodiments may be a flexible electronic device. Furthermore, an electronic device according to an embodiment of the present disclosure will not be limited to the above-described devices, and may be a new electronic device introduced as technology progresses.

An electronic device according to various embodiments of the present disclosure will be described with reference to the accompanying drawings. As used herein, the term "user" may refer to a person who uses the electronic device, or a device (e.g., an intelligent electronic device) that uses the electronic device.

FIG. 1 is a block diagram illustrating a configuration of an electronic device according to various embodiments of the present disclosure. Referring to FIG. 1, an electronic device 100 according to an embodiment of the present disclosure may include at least one of a controller 110, a conversion circuit 120, a wireless power transceiver 130, a transmission/reception switch 140, first and second frequency controllers 151 and 152, a power supply 160, a communication unit 170, a sensor unit 180, a voltage converter 191, a charging circuit 192 and a battery 193.

According to various embodiments of the present disclosure, the controller (e.g., a processor) 110 may determine whether the electronic device 100 is in a wireless power transmission (Tx) mode for transmitting wireless power to another electronic device, or in a wireless power reception (Rx) mode for receiving wireless power from another electronic device.

The method of determining the wireless power transmission mode or the wireless power reception mode may be implemented in many different ways. For example, the controller 110 may determine the wireless power transmission mode or the wireless power reception mode by detecting a load change using at least one coil provided in the wireless power transceiver 130 by means of the sensor unit 180.

Furthermore, according to various embodiments of the present disclosure, the controller 110 may determine the wireless power transmission mode or the wireless power reception mode using an in-band signal received through the wireless power transceiver 130. Moreover, according to various embodiments of the present disclosure, the controller 110 may determine the wireless power transmission mode or the wireless power reception mode based on an out-of-band signal received from another electronic device through the communication unit 170.

Furthermore, according to various embodiments of the present disclosure, the controller 110 may determine a wireless charging scheme (e.g., the induction scheme or the resonance scheme) or a wireless charging frequency (e.g., 100~205 kHz, 100~300 kHz, 6.78 MHz or the like) supported by another electronic device detected for wireless charging from the in-band signal or the out-of-band signal.

According to various embodiments of the present disclosure, specific examples such as a method of determining the wireless power transmission mode or the wireless power reception mode by the controller 110 and a method of determining the wireless charging scheme (e.g., the induction scheme or the resonance scheme) or the wireless charging frequency (e.g., 100~205 kHz, 100~300 kHz, 6.78 MHz or the like) by the controller 110, will be described in more detail in the following description of FIGS. 15A to 15E.

If the controller 110 determines the wireless power reception mode, the controller 110 may control the transmission/reception switch 140 to switch a connection path of the conversion circuit 120 to the voltage converter 191. In the wireless power reception mode, the electronic device 100 may receive wireless power through the wireless power transceiver 130 (e.g., a first wireless power transceiver 131 or a second wireless power transceiver 132).

The wireless power, which is alternating current (AC) power, received through the wireless power transceiver 130 may be converted into direct current (DC) power by the conversion circuit 120, and the wireless power converted (e.g., rectified) into the DC current may be provided to the voltage converter 191 through the transmission/reception switch 140.

The voltage converter 191 may convert the wireless power received through the conversion circuit 120 to a preset voltage. For example, the voltage converter 191 may convert the input voltage to an output voltage of 5V. The minimum value and maximum value of a voltage that can be applied to the input of the voltage converter 191 may be set in advance. The voltage may be converted by the voltage converter 191, and then, used to charge the battery 193 through the charging circuit 192. The charging circuit 192 may operate under control of the controller 110, and the controller 110 may be provided with a variety of charging-related information through the charging circuit 192.

If the controller 110 determines that the electronic device 100 should be in the wireless power transmission mode, the controller 110 may control the transmission/reception switch 140 to switch a connection path of the conversion circuit 120 to the power supply 160 rather than to the voltage converter 191. Accordingly, the power supply 160 may supply DC power to the conversion circuit 120 via the transmission/reception switch 140. The power supply 160 may be provided with power from an external power supply such as a wall adaptor or a travel adaptor, and may also be provided with power from the battery 193, or another battery or a rechargeable battery provided in the electronic device 100.

If the controller 110 determines that the electronic device 200 should be in the wireless power transmission mode as described above, the controller 110 may generate a control signal corresponding to a wireless power transmission frequency that the controller 110 desires to transmit to the conversion circuit 120, and transmit the generated control signal to the conversion circuit 120.

The conversion circuit 120 may convert the DC power supplied from the power supply 160 through the transmission/reception switch 140 into AC power corresponding to the frequency and/or the wireless transmission scheme specified in the control signal provided by the controller 110.

The AC power converted by the conversion circuit 120 may be provided to the wireless power transceiver 130. The wireless power transceiver 130 may transmit the AC power from the conversion circuit 120 to the electronic device that the wireless power transceiver 130 desires to charge.

According to various embodiments of the present disclosure, when the electronic device 100 provides a plurality of wireless charging schemes (e.g., the induction scheme, the resonance scheme, and the like) and/or wireless charging frequencies (e.g., 100~205 kHz, 100~300 kHz, 6.78 MHz or the like), the electronic device 100, when in the wireless power transmission mode, may determine the charging scheme(s) supported by the electronic device that is to be charged, thereby providing wireless charging power with the relevant wireless charging scheme or wireless charging frequency.

For example, when another electronic device that the electronic device 100 desires to charge supports a wireless charging scheme at a first frequency, the controller 110 may receive a control signal corresponding to the first frequency through the first frequency controller 151 by controlling of the controller 110, and output a control signal corresponding to the received control signal to the conversion circuit 120. Furthermore, when another electronic device that the electronic device 100 desires to charge supports a wireless charging scheme by a second frequency, the controller 110 may receive a control signal corresponding to the second frequency through the second frequency controller 152151 by controlling of the controller 110, and output a control signal corresponding to the received control signal to the conversion circuit 120.

Although the first frequency controller 151 and the second frequency controller 152 are shown in FIG. 1 to support a plurality of wireless charging schemes at two different frequencies, the present disclosure will not be limited thereto. For example, the electronic device 100 according to various embodiments of the present disclosure may include three or more frequency controllers. Furthermore, according to various embodiments of the present disclosure, the first frequency controller 151 and the second frequency controller 152 may be replaced by a controller of a first wireless charging scheme (e.g., the induction scheme) and a controller of a second wireless charging scheme (e.g., the resonance scheme), respectively. Furthermore, according to various embodiments of the present disclosure, the first frequency controller 151 and the second frequency controller 152 may be integrated in the controller 110. Moreover, according to various embodiments of the present disclosure, the first frequency controller 151 and the second frequency controller 152 may be implemented so as to use the same wireless charging scheme (e.g., the induction scheme) and output control signals corresponding to different or similar frequencies.

The first frequency controller 151 and/or the second frequency controller 152 may include an oscillator for outputting the desired frequency signal. Furthermore, the first frequency controller 151 and/or the second frequency controller 152 may output signal, data or information corresponding to the desired frequency, and may output a clock signal corresponding to the desired frequency.

The controller 110 may output a control signal capable of controlling the conversion circuit 120 so as to receive a signal corresponding to the relevant frequency or the relevant wireless charging scheme from the first frequency controller 151 or the second frequency controller 152, and generate AC power corresponding to the relevant frequency or the relevant wireless charging scheme in the conversion circuit 120. Each of 151 and 152 output a signal corresponding to the relevant frequency or the relevant wireless charging scheme, so the control 110 receives the signal transmitted from each of 151 and 152. A detailed configuration of the conversion circuit 120 will be described in detail below in the description of FIGS. 2 to 14.

The wireless power transceiver 130 may include a plurality of first and second wireless power transceivers 131 and 132 depending on the wireless charging scheme and/or wireless charging frequency supported by the electronic device 100. For example, if there are two wireless charging schemes or wireless charging frequencies, the first wireless power transceiver 131 and the second wireless power transceiver 132 may be provided as shown in FIG. 1.

The first wireless power transceiver 131 may correspond to the first frequency controller 151 and the second wireless power transceiver 132 may correspond to the second frequency controller 152, but the present disclosure will not be limited thereto.

The first wireless power transceiver 131 and the second wireless power transceiver 132 may be connected to the conversion circuit 120 independently, and may also be connected to the conversion circuit 120 in parallel as shown in FIG. 1. When the first wireless power transceiver 131 and the second wireless power transceiver 132 are connected to the conversion circuit 120 in parallel as shown in FIG. 1, the first wireless power transceiver 131 and the second wireless power transceiver 132 may constitute a circuit so that the first wireless power transceiver 131 and the second wireless power transceiver 132 may be isolated from each other during wireless power transmission/reception. A detailed description thereof will be made below in the description of FIG. 2 and the subsequent drawings.

The AC power corresponding to the first frequency that is generated in the conversion circuit 120 under control of the first frequency controller 151 may be provided to the first wireless power transceiver 131 and the second wireless power transceiver 132, and the AC power may be wirelessly transmitted through the first wireless power transceiver 131 depending on the circuit configurations of the first wireless power transceiver 131 and the second wireless power transceiver 132. Furthermore, the AC power corresponding to the second frequency that is generated in the conversion circuit 120 under control of the second frequency controller 152 may be provided to the first wireless power transceiver 131 and the second wireless power transceiver 132, and the AC power may be wirelessly transmitted through the second wireless power transceiver 132 depending on the circuit configurations of the first wireless power transceiver 131 and the second wireless power transceiver 132.

Figure 16:
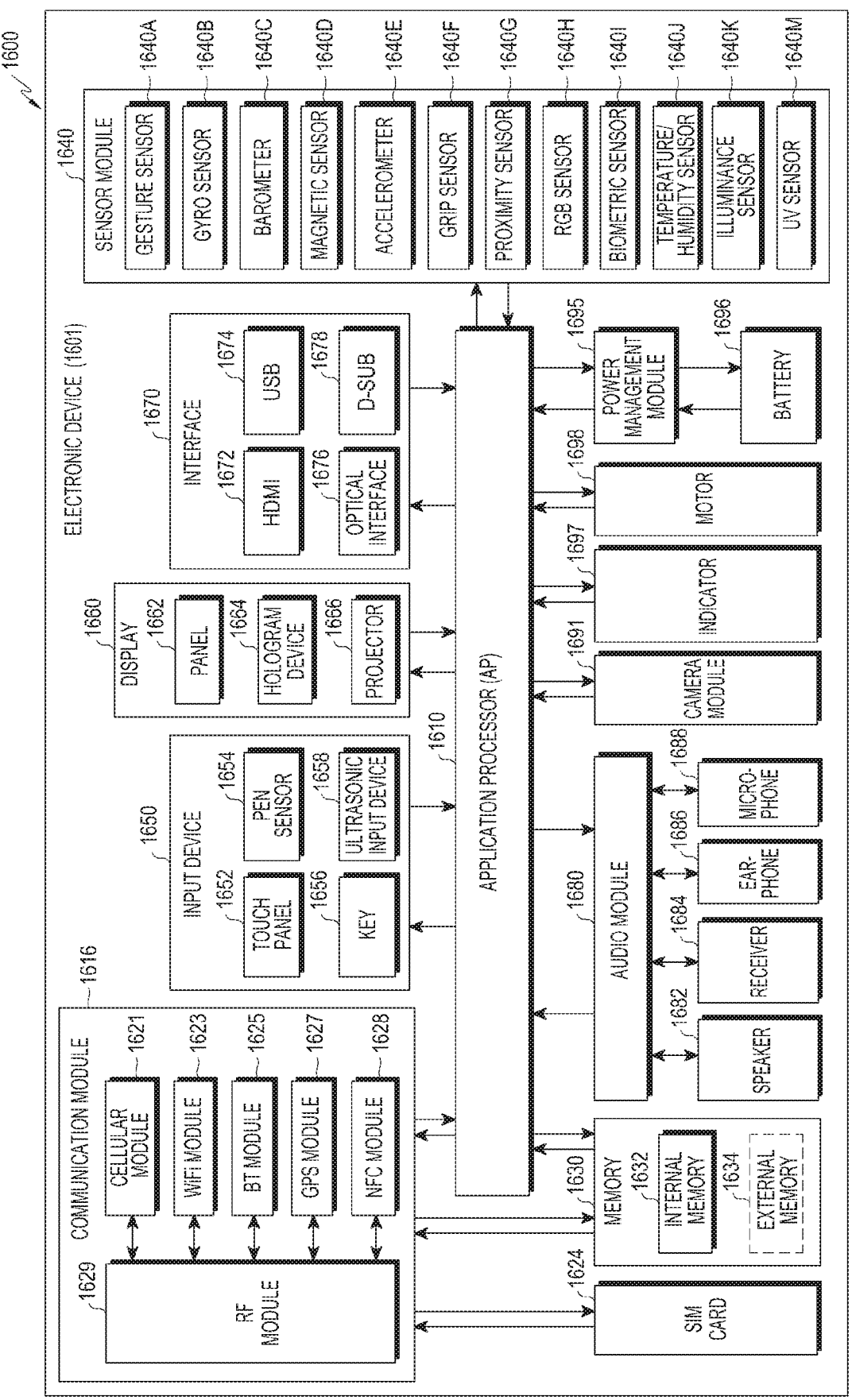
FIG. 16 is a block diagram illustrating a detailed structure of an electronic device according to various embodiments of the present disclosure.

According to various embodiments of the present disclosure, the whole or a part of the controller 110 may be included in at least a portion of an application processor (AP) 1610 or a communication module (or a communication processor (CP)) 1620 in FIG. 16.

In various embodiments of the present disclosure, the term "function unit" or "module" may refer to a functional or structural combination of hardware for performing the technical concept of various embodiments of the present disclosure and software for running the hardware. For example, the function unit or the module may refer to a logical unit of a predetermined code and hardware resources for which the predetermined code is to be executed, and it can be readily understood by those skilled in the art that a function unit or a module does not necessarily refer to a structurally connected code or one type of hardware.

An electronic device according to any one of various embodiments of the present disclosure may include a power supply configured to supply direct current (DC) power; a controller configured to determine a wireless power transmission mode or a wireless power reception mode if at least one electronic device is detected, and output a control signal corresponding to a wireless power transmission frequency supportable in the detected electronic device among a plurality of transmittable wireless power transmission frequencies if the wireless power transmission mode is determined; a conversion circuit configured to output the DC power supplied from the power supply as alternating current (AC) power in response to the control signal output from the controller; and a wireless power transceiver configured to transmit the AC power supplied from the conversion circuit to a wireless space.

According to various embodiments of the present disclosure, the electronic device may further include a transmission/reception switch configured to receive a control signal from the controller depending on the determination of a wireless power transmission mode or a wireless power reception mode by the controller, and switch a connection path of the conversion circuit to the power supply or a charging circuit depending on the received control signal.

According to various embodiments of the present disclosure, the conversion circuit may convert the AC power received through the wireless power transceiver into DC power in the wireless power reception mode.

According to various embodiments of the present disclosure, the wireless power transmission frequency may include at least one of a frequency corresponding to a resonance scheme, a frequency corresponding to an induction scheme, or a frequency corresponding to a radio wave radiation scheme.

According to various embodiments of the present disclosure, the conversion circuit may be implemented with a full-bridge field-effect transistor (FET) circuit configured using four metal oxide semiconductor field-effect transistors (MOSFETs).

According to various embodiments of the present disclosure, the conversion circuit may be implemented with a circuit including two MOSFETs and two diodes.

According to various embodiments of the present disclosure, the wireless power transceiver may include a plurality of coils each corresponding to each frequency of the plurality of wireless power transmission frequencies.

According to various embodiments of the present disclosure, the wireless power transceiver may include an induction scheme wireless power transceiver configured to transmit and receive wireless power corresponding to a frequency of an induction scheme; and a resonance scheme wireless power transceiver configured to transmit and receive wireless power corresponding to a frequency of a resonance scheme.

According to various embodiments of the present disclosure, the induction scheme wireless power transceiver and the resonance scheme wireless power transceiver may be connected to the conversion circuit in parallel.

According to various embodiments of the present disclosure, the induction scheme wireless power transceiver or the resonance scheme wireless power transceiver may include a coil and at least one capacitor.

In various embodiments of the present disclosure, the electronic device 100 may include a smart car. The smart car may refer to a car that recognizes its internal/external situations in real time by integrating the next-generation electric/electronic, information communication and control technologies. The smart car is also called a connected car. Since the smart car can be driven using an electric battery rather than the fossil fuel, the smart car may be construed to include an electric car. For example, the electronic device 100 including the controller 110, the conversion circuit 120, the wireless power transceiver 130, the transmission/reception switch 140, the frequency controllers 151 and 152, the power supply 160, the communication unit 170, the sensor unit 180, the voltage converter 191, the charging circuit 192 and the battery 193 may include an electric car.

For the conversion circuit 120, the wireless power transceiver 130, the transmission/reception switch 140, the frequency controllers 151 and 152, the power supply 160, the sensor unit 180, the voltage converter 191, the charging circuit 192 and the battery 193, their structures, circuits and/or sizes may be changed to correspond to the large capacity of power (the capacity of several to tens of kW).

According to various embodiments of the present disclosure, the controller 110 (e.g., a processor) may determine whether the electronic device 100 (e.g., an electric car) is in a wireless power transmission mode for wirelessly transmitting power to other electronic devices (e.g., a smart phone, a tablet PC or the like), or in a wireless power reception mode for receiving wireless power from other electronic devices (e.g., an external wireless charging transmission device).

The smart car 100 may determine whether it is in the wireless power transmission mode or the wireless power reception mode, using at least one of a load change of the sensor unit 180, an in-band signal of the wireless power transceiver 130, and an out-band signal of the communication unit 170. Further, the smart car 100 may determine a wireless charting scheme (e.g., the induction scheme or the resonance scheme) or the wireless charging frequency (e.g., 100~205 kHz, 100~300 kHz, 6.78 MHz or the like) supported by other electronic devices, using the in-band signal of the wireless power transceiver 130 and the out-band signal of the communication unit 170.

If the smart car 100 is stopped or parked in the vicinity of a wireless power transmission device (not shown) in the place (e.g., a parking lot, a road, a charging station or the like) where power can be wirelessly transmitted to the smart car 100, the smart car 100 may determine the wireless power reception mode using the sensor unit 180, the wireless power transceiver 130 or the communication unit 170.

The power may be wirelessly transmitted to the smart car 100, using a wireless power transmission pad (not shown) connected to the wireless power transmission device (not shown) installed in the place where wireless power can be transmitted. For example, the power may be wirelessly transmitted to the smart car 100 through the wireless power transmission pad (not shown) of the wireless power transmission device (not shown), which is located to face the bottom or side of the smart car 100.

The wireless power transmission pad of the wireless power transmission device (not shown) may be one or plural in number. One wireless power transmission pad may have the capacity of several to tens of kW. The wireless power transmission device (not shown) may rapidly wirelessly charge the smart car 100 using a plurality of wireless power transmission pads.

The conversion circuit 120, the wireless power transceiver 130, the transmission/reception switch 140, the voltage converter 191, the charging circuit 192 and the battery 193 may also be changed to correspond to the reception (or charging) of the wireless power in the capacity of several to tens of kW.

If the smart car 100 receives the power supplied from the outside in the wireless power reception mode, the controller 110 of the smart car 100 may switch a connection path of the conversion circuit 120 to the voltage converter 191 by controlling the transmission/reception switch 140, to connect the conversion circuit 120 to the voltage converter 191.

The smart car 100 in the wireless power reception mode may receive the wireless power transmitted from the wireless power transmission pad (not shown) through the wireless power transceiver 130, or the second wireless power transceiver 132 corresponding to the resonance scheme that is the determined wireless charging scheme.

The power received through the wireless power transceiver 130 may be converted (e.g., rectified) from AC power to DC power through the conversion circuit 120, and supplied to the voltage converter 191 through the transmission/reception switch 140.

The voltage converter 191 may convert the wireless power received through the conversion circuit 120 with a preset gain. For example, the voltage converter 191 may convert the wireless power into a voltage at the output end, which corresponds to the capacity of several to tens of kW.

The voltage converted through the voltage converter 191 may charge the large-capacity battery 193 mounted in the smart car 100 through the charging circuit 192. The charging circuit 192 may operate under control of the controller 110, and the controller 110 may receive a variety of charging-related information through the charging circuit 192.

It will be apparent to those skilled in the art that not only the resonance scheme but also the induction scheme or the electromagnetic scheme may be applied to the smart car 100, for wireless charging.

According to various embodiments of the present disclosure, the controller 110 (e.g., a processor) may determine the wireless power transmission mode for wirelessly transmitting the power from the electronic device 100 (e.g., an electric car) to other electronic devices (e.g., a smart phone, a tablet PC or the like).

In detail, the smart car 100 may switch to the wireless power transmission mode for wirelessly transmitting the power to other electronic devices (e.g., the smart phone, the tablet PC or the like) existing in the smart car 100 using the sensor unit 180, the wireless power transceiver 130 or the communication unit 170 included in the smart car 100.

Furthermore, the smart car 100 may determine the wireless charging scheme (e.g., the induction scheme) and the wireless charging frequency (e.g., 100~205 kHz, 100~300 kHz, 6.78 MHz or the like) for wirelessly charging the wireless power transmission pad (not shown) and other electronic devices located within the smart car 100 using the in-band signal of the wireless power transceiver 130 and the out-band signal of the communication unit 170.

The smart car 100 in the wireless power transmission mode may transmit wireless power to other electronic devices (not shown) through the wireless power transceiver 130, or the first wireless power transceiver 131 corresponding to the induction scheme that is the determined wireless charging scheme.

In the wireless power transmission mode, the controller 110 of the smart car 100 may connect the conversion circuit 120 to the power supply 160 by controlling the transmission/reception switch 140. The power supply 160 may supply AC power to the conversion circuit 120. The power supply 160 may be the above-described battery 193, or another battery separately mounted in the smart car 100.

In the wireless power transmission mode, the controller 110 of the smart car 100 may generate a control signal corresponding to the wireless power transmission frequency of the wireless charging scheme (e.g., the induction scheme), and provide the generated control signal to the conversion circuit 120.

The conversion circuit 120 may convert the AC power supplied from the power supply 160 into AC power corresponding to the wireless charging scheme and the wireless power transmission frequency depending on the control signal received from the controller 110. The wireless power transceiver 130 (e.g., the wireless power transmission pad) may transmit the AC power provided from the conversion circuit 120 to the space to wirelessly transmit the power to other electronic devices.

It will be apparent to those skilled in the art that not only the induction scheme but also the resonance scheme or the electromagnetic scheme may be applied to the smart car 100, for wireless charging.

The wireless charging scheme in the wireless power reception mode between the smart car 100 and the external wireless power transmission device (not shown) may be different from the wireless charging scheme between the smart car 100 and other electronic devices (not shown)

therein. For example, the wireless charging scheme in the wireless power reception mode between the smart car 100 and the external wireless power transmission scheme (not shown) may be the resonance scheme, and the wireless charging scheme between the smart car 100 and other electronic devices (not shown) therein may be the induction scheme, or vice versa.

Although the first frequency controller 151 and the second frequency controller 152 are provided to support multiple wireless charging schemes corresponding to different frequencies, the smart car 100 is not limited thereto. For example, the smart car 100 according to various embodiments of the present disclosure may include three or more frequency controllers (e.g., the electromagnetic scheme or more).

According to various embodiments of the present disclosure, the first frequency controller 151 and the second frequency controller 152 may be replaced with the first wireless charging scheme (e.g., the induction scheme) controller and the second wireless charging scheme (e.g., the resonance scheme) controller, respectively. Further, the first frequency controller 151 and the second frequency controller 152 may be configured to be integrated in the controller 110.

The first wireless power transceiver 131 and the second wireless power transceiver 132 may be connected to the conversion circuit 120 independently or in parallel, respectively. Further, the first wireless power transceiver 131 and the second wireless power transceiver 132 may be implemented within one housing (not shown), or may be separately implemented in separate housings (not shown), respectively.

According to various embodiments of the present disclosure, the first wireless power transceiver 131 and the second wireless power transceiver 132 may be separately implemented, so the first wireless power transceiver 131 may be located outside the smart car and receive wireless power from the external power supply by various wireless charging schemes such as the magnetic resonance scheme, the magnetic induction scheme and the electromagnetic scheme, to charge the battery mounted in the smart car. The second wireless power transceiver 132 may transmit the power supplied from the battery mounted in the smart car to charge other electronic devices within the smart car, such as the table PC and the smart phone, by various wireless charging schemes.

Various embodiments of the present disclosure configured with the circuit in FIG. 1 will be described below with reference to FIGS. 2 to 14.

Figure 2:
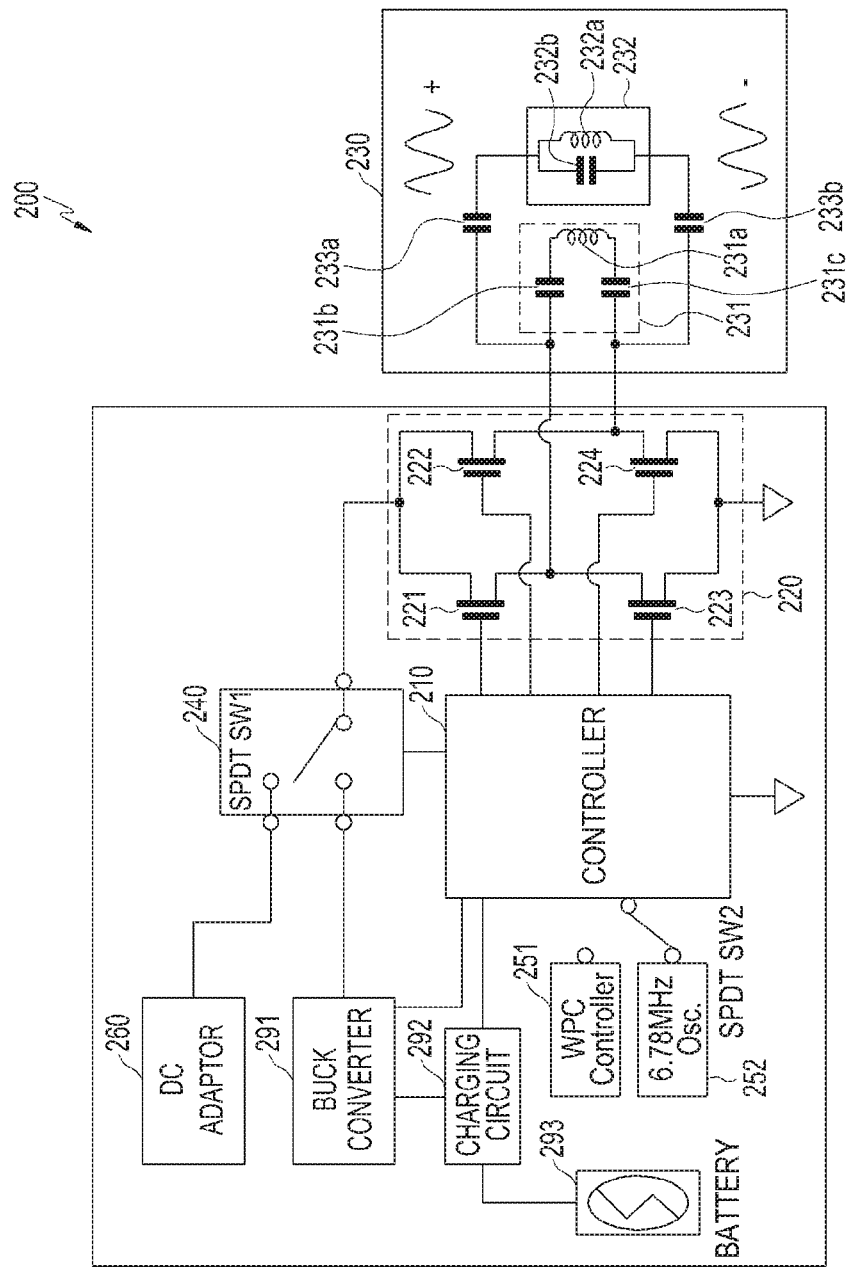
FIG. 2 is a detailed circuit diagram of an electronic device according to various embodiments of the present disclosure.

FIG. 2 is a detailed circuit diagram of an electronic device according to various embodiments of the present disclosure. Referring to FIG. 2, an electronic device 200 according to an embodiment of the present disclosure may include a controller 210, a conversion circuit 220, a wireless power transceiver 230, a transmission/reception switch 240, frequency controllers 251 and 252, a DC adaptor 260, a buck converter (voltage converter) 291, a charging circuit 292, and a battery 293. Each of the components in FIG. 2 may correspond to similar components in FIG. 1.

According to various embodiments of the present disclosure, the controller 210 may determine whether the electronic device 200 is in a wireless power transmission (Tx) mode for transmitting wireless power to another electronic device, or in a wireless power reception (Rx) mode for receiving wireless power from another electronic device.

The method of determining the wireless power transmission mode or the wireless power reception mode may be implemented in many different ways. For example, the controller 210 may determine the wireless power transmission mode or the wireless power reception mode by detecting a load change using at least one coil provided in the wireless power transceiver 230.

Furthermore, according to various embodiments of the present disclosure, the controller 210 may determine the wireless power transmission mode or the wireless power reception mode using an in-band signal received through the wireless power transceiver 230. Moreover, according to various embodiments of the present disclosure, the controller 210 may determine the wireless power transmission mode or the wireless power reception mode based on an out-of-band signal received from another electronic device.

Furthermore, according to various embodiments of the present disclosure, the controller 210 may determine a wireless charging scheme (e.g., the induction scheme or the resonance scheme) or a wireless charging frequency (e.g., 100~205 kHz, 100~300 kHz, 6.78 MHz or the like) supported by another electronic device detected for wireless charging from the in-band signal or the out-of-band signal.

According to various embodiments of the present disclosure, specific examples such as a method of determining the wireless power transmission mode or the wireless power reception mode by the controller 210 and a method of determining the wireless charging scheme (e.g., the induction scheme, the resonance scheme, or the like) or the wireless charging frequency (e.g., 100~205 kHz, 100~300 kHz, 6.78 MHz or the like) by the controller 210, will be described in more detail in the following description of FIGS. 15A to 15E.

If the controller 210 determines the wireless power reception mode, the controller 210 may control the transmission/reception switch 240 to switch a connection path of the conversion circuit 220 to the buck converter 291. In the wireless power reception mode, the electronic device 200 may receive wireless power through the wireless power transceiver 230 (e.g., via a first coil 231*a*, a second coil 232*a*, etc. in a first wireless power transceiver 231, a second wireless power transceiver 232, etc., respectively).

According to various embodiments of the present disclosure, the first wireless power transceiver 231 and/or the second wireless power transceiver 232 may include at least one coil and at least one capacitor. For example, the first wireless power transceiver 231 that supports the induction scheme may include a first coil 231*a*, a first capacitor 231*b* and a second capacitor 231*c*. Furthermore, the second wireless power transceiver 232 that supports the resonance scheme may include a second coil 232*a* and a third capacitor 232*b*. Moreover, according to various embodiments of the present disclosure, a fourth capacitor 233*a* and a fifth capacitor 233*b* may be further provided between the first wireless power transceiver 231 and the second wireless power transceiver 232 for independent operation therebetween.

As described above, the first wireless power transceiver 231 and the second wireless power transceiver 232 may operate in isolation from each other depending on the operating frequency. For example, if it is assumed that the first wireless power transceiver 231 is designed for the resonance scheme that uses a 6.78 MHz frequency signal, and the second wireless power transceiver 232 is designed for the induction scheme that uses a 105 kHz frequency signal, the first wireless power transceiver 231 and the second wireless power transceiver 232 may operate in isolation from each other during power transmission/reception according to each scheme by the circuit configuration as shown in FIG. 2.

As a more specific example, when the electronic device 200 operates with the induction scheme, a 150 kHz signal may be transmitted and received through the wireless power transceiver 230. If the fourth capacitor 233a and the fifth capacitor 233b configured between the first wireless power transceiver 231 and the second wireless power transceiver 232 are designed to have an impedance of 500Ω or more, the first wireless power transceiver 231 and the second wireless power transceiver 232 may be regarded as circuits that are open to each other with respect to a 150 kHz transmission signal.

On the other hand, when the electronic device 200 operates with the resonance scheme, a 6.78 MHz signal may be transmitted and received through the wireless power transceiver 230. If an inductance of the first coil 231a in the first wireless power transceiver 231 is, for example, 7~10 μH, since the first wireless power transceiver 231 has an impedance of 300~400Ω, the first coil 231a may be regarded as a circuit that is almost open.

Therefore, even though wireless power transceivers of two schemes are connected to the conversion circuit 220 in parallel as shown in FIG. 2, the wireless power transceivers may be implemented such that the wireless power transceivers may operate independently in isolation from each other with this circuit design.

The wireless power, which is AC power, received through the wireless power transceiver 230 may be converted into DC power by the conversion circuit 220, and the wireless power converted (e.g., rectified) into the DC power may be provided to the buck converter 291 via the transmission/reception switch 240. The conversion circuit 220, as shown, may be implemented with a full-bridge FET circuit configured using the first, second, third, and fourth MOSFETs 221, 222, 223 and 224. A detailed operation of the full-bridge FET circuit constituting the conversion circuit 220 will be described below. Furthermore, according to various embodiments of the present disclosure, the conversion circuit 220 may be implemented with a half-bridge circuit shown in FIGS. 11 to 14. According to various embodiments of the present disclosure, the conversion circuit 220 may be implemented not only with the above mentioned circuits, but also with any circuit that can provide transmission and reception operations at the same time.

The buck converter 291 may convert the wireless power received through the conversion circuit 220 to a preset voltage. For example, buck converter 291 may convert a voltage of the received wireless power so that the output voltage may be 5V. According to various embodiments of the present disclosure, the buck converter 291 may be configured with a circuit that includes at least one coil, at least one capacitor, and/or at least one FET.

The wireless power, whose voltage is converted by the buck converter 291, may be used to charge the battery 293 by the charging circuit 292. The charging circuit 292 may operate under control of the controller 210, and the controller 210 may be provided with a variety of charging-related information through the charging circuit 292.

If the controller 210 determines that the electronic device 200 should be in the wireless power transmission mode, the controller 210 may control the transmission/reception switch 240 to switch a connection path of the conversion circuit 220 to the DC adaptor 260 rather than to the buck converter 291. Under control of the transmission/reception switch 240, the DC adaptor 260 may supply AC power to the conversion circuit 220.

If the controller 210 determines that the electronic device 200 should be in the wireless power transmission mode as described above, the controller 210 may generate a control signal corresponding to the wireless power transmission frequency that the controller 210 desires to transmit to the conversion circuit 220, and provide the generated control signal to the conversion circuit 220.

The conversion circuit 220 may convert the DC power supplied from the DC adaptor 260 via the transmission/reception switch 240 into AC power corresponding to the frequency and/or the wireless transmission scheme depending on the control signal provided by the controller 210. A detailed operation of the full-bridge FET circuit constituting the conversion circuit 220 will be described below.

The AC power converted by the conversion circuit 220 may be provided to the wireless power transceiver 230. The wireless power transceiver 230 may transmit the AC power provided by the conversion circuit 220, to transmit the charging power to the electronic device that the wireless power transceiver 230 desires to charge.

According to various embodiments of the present disclosure, when the electronic device 200 provides a plurality of wireless charging schemes (e.g., the induction scheme, the resonance scheme, and the like) and/or wireless charging frequencies (e.g., 100~205 kHz, 100~300 kHz, 6.78 MHz or the like), the electronic device 200, in the wireless power transmission mode, may determine the charging scheme supported by the electronic device that the electronic device 200 desires to charge, thereby providing wireless charging power with the correct wireless charging scheme and/or wireless charging frequency.

For example, when another electronic device that the electronic device 200 desires to charge supports the induction scheme of wireless charging (e.g., the WPC standard), the controller 210 may receive a control signal corresponding to the WPC standard through the frequency controller 251, and output a control signal corresponding to the received control signal to the conversion circuit 220. Furthermore, when another electronic device that the electronic device 200 desires to charge supports the resonance scheme of wireless charging, the controller 210 may receive a frequency (e.g., 6.78 MHz) signal of the resonance scheme through the frequency controller 252 (for the resonant scheme), and output a control signal corresponding to the received frequency signal to the conversion circuit 220.

Although the frequency controller 251 (for the induction scheme) and the frequency controller 252 (for the resonant scheme) are shown in FIG. 2 to support a plurality of wireless charging schemes, the present disclosure will not be limited thereto. For example, the electronic device 200 according to various embodiments of the present disclosure may include three or more frequency controllers with their attendant frequencies that may be design and/or implementation dependent.

The controller 210 may receive a signal corresponding to the relevant frequency or relevant wireless charging scheme from the frequency controller 251 and/or the frequency controller 252, and output a control signal capable of controlling the conversion circuit 220 so that the conversion circuit 220 may generate AC power corresponding to the relevant frequency and/or relevant wireless charging scheme.

The wireless power transceiver 230 may include the first and second wireless power transceivers 231 and 232 depending on the wireless charging schemes and/or wireless charging frequencies supported by the electronic device 200. For example, if there are two supported wireless charging schemes with two wireless charging frequencies, the wireless power transceiver 230 may include the first wireless power transceiver 231 and the second wireless power transceiver 232 as shown in FIG. 2.

The first wireless power transceiver 231 may correspond to wireless power transmission/reception of the induction scheme, and the second wireless power transceiver 232 may correspond to wireless power transmission/reception of the resonance scheme, but the present disclosure will not be limited thereto.

The first wireless power transceiver 231 and the second wireless power transceiver 232 may be connected in parallel, and connected to the conversion circuit 220 as shown in FIG. 2 such that operation of the first wireless power transceiver 231 does not affect operation of the second wireless power transceiver 232.

The controller 210 may control the conversion circuit 220 depending on the control signal received from the frequency controller 251. For example, when transmitting in the induction scheme, power may be provided at a frequency corresponding to the induction scheme to the wireless power transceiver 230 for transmission to another electronic device through the first wireless power transceiver 231 in the wireless power transceiver 230. Furthermore, the controller 210 may control the conversion circuit 220 depending on a frequency signal received from the frequency controller 252 to provide power at a frequency corresponding to the resonance scheme to the wireless power transceiver 230 for transmission to another electronic device through the second wireless power transceiver 232 in the wireless power transceiver 230.

Next, reference will be made to FIGS. 3 to 6 to describe an operation of the wireless power transmission mode in the circuit of FIG. 2, and reference will be made to FIGS. 7, 8A and 8B to describe operation of the wireless power reception mode in the circuit of FIG. 2.

Figure 3:
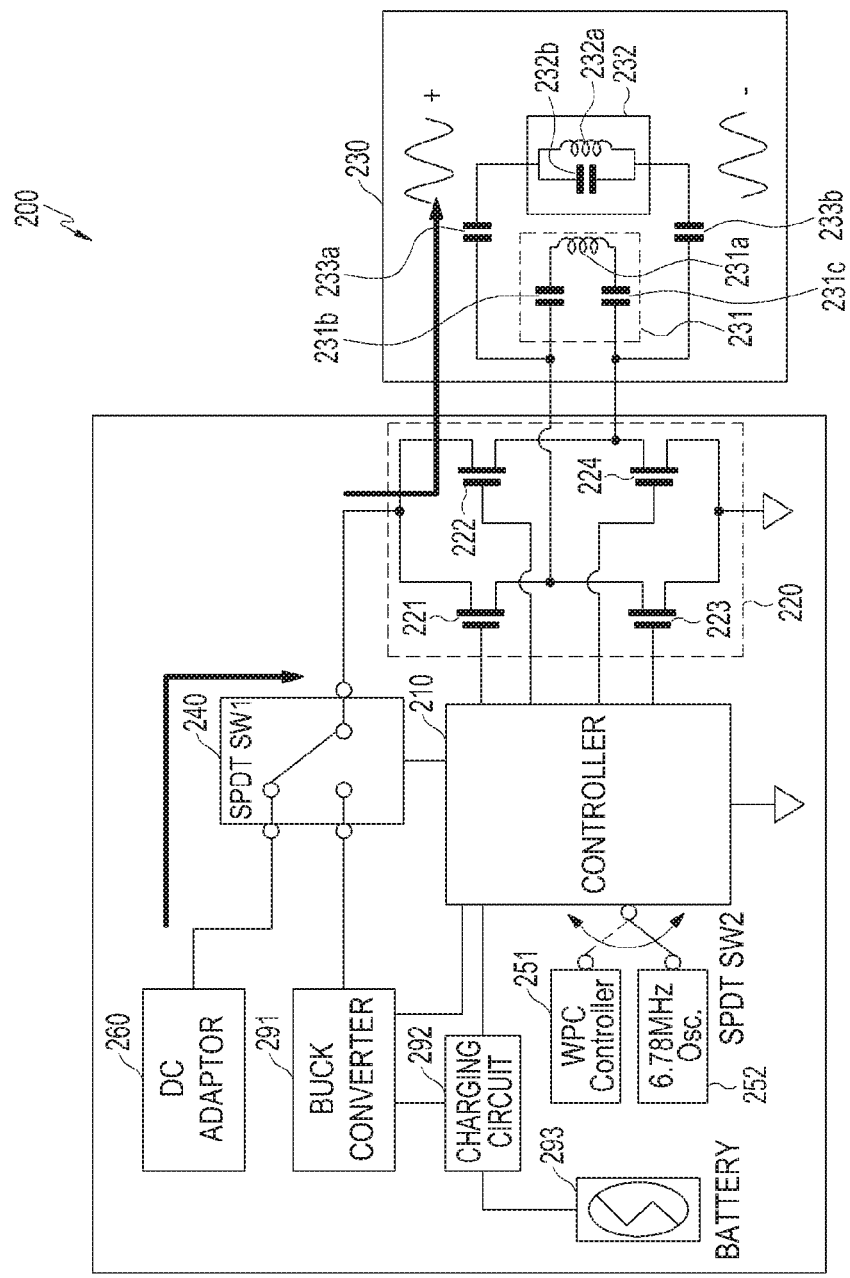
FIG. 3 illustrates a current flow in a wireless power transmission mode of an electronic device according to various embodiments of the present disclosure.

FIG. 3 illustrates a current flow in a wireless power transmission mode of an electronic device according to various embodiments of the present disclosure. Referring to FIG. 3, if the controller 210 determines that the electronic device 200 should be in the wireless power transmission mode in the circuit of FIG. 2, the controller 210, as described above, may control the transmission/reception switch 240 to connect or switch the conversion circuit 220 to the DC adaptor 260.

Under control of the transmission/reception switch 240 by the controller 210, DC power from the DC adaptor 260 may be supplied to the conversion circuit 220 via the transmission/reception switch 240. The conversion circuit 220 may control ON/OFF state of at least one of the first, second, third, and fourth MOSFETs 221, 222, 223 and 224 depending on the control signal from the controller 210 to output the DC power supplied from the DC adaptor 260 as AC power corresponding to the relevant frequency.

A detailed operation of the conversion circuit 220 in the wireless power transmission mode will be described below with reference to FIGS. 4A and 4B.

Figure 4A:
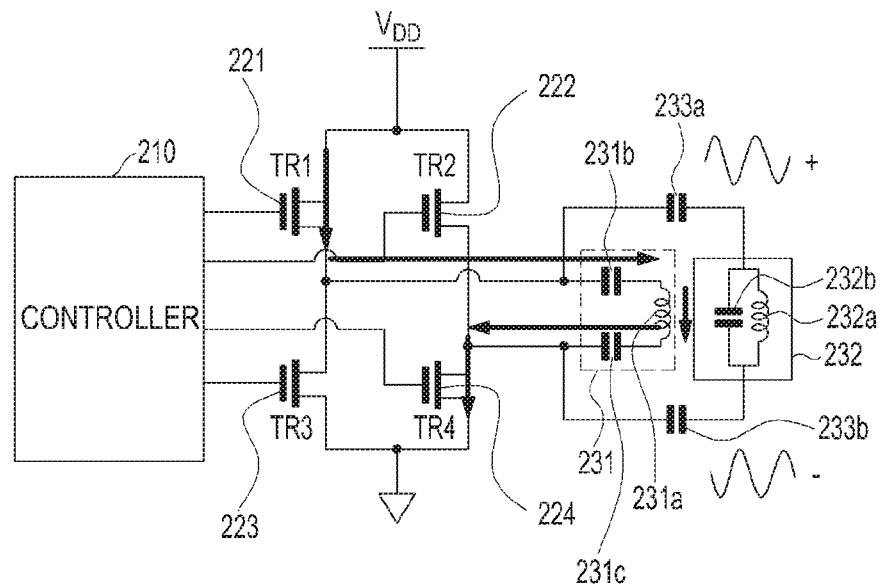
FIGS. 4A and 4B illustrate a detailed current flow in a wireless power transmission mode of an electronic device according to various embodiments of the present disclosure.
Figure 4B:
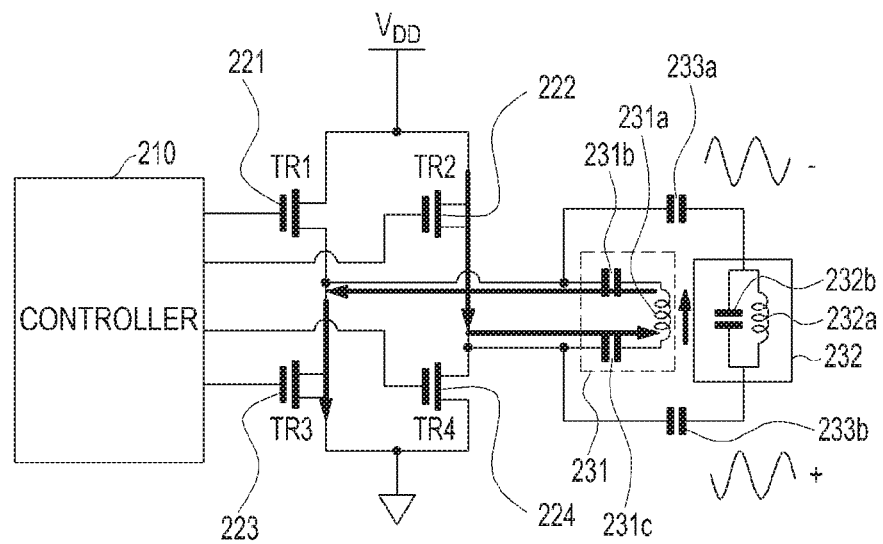

FIGS. 4A and 4B illustrate a detailed current flow in a wireless power transmission mode of an electronic device according to various embodiments of the present disclosure.

Referring to FIG. 4A, the controller 210 may turn on the first MOSFET 221 and the fourth MOSFET 224 and turn off the second MOSFET 222 and the third MOSFET 223 to output a positive signal. Under control of the controller 210, DC power supplied as a $V_{DD}$ voltage may be supplied to the first wireless power transceiver 231 via the first MOSFET 221, and may flow to the fourth MOSFET 224 via the first capacitor 231b, the first coil 231a and the second capacitor 231c of the first wireless power transceiver 231. Accordingly, a positive current may flow in the first coil 231a.

Referring to FIG. 4B, the controller 210 may turn off the first MOSFET 221 and the fourth MOSFET 224 and turn on the second MOSFET 222 and the third MOSFET 223 to output a negative signal. Under control of the controller 210, DC power supplied as a $V_{DD}$ voltage may be supplied to the first wireless power transceiver 231 via the second MOSFET 222, and may flow to the third MOSFET 223 via the second capacitor 231c, the first coil 231a and the first capacitor 231b of the first wireless power transceiver 231. Accordingly, a negative current may flow in the first coil 231a.

Although it is assumed in FIGS. 4A and 4B that an AC current flows in the first coil 231a by application of the induction scheme, an AC current may flow in the second coil 232a by application of the resonance scheme in the same principle.

The controller 210 may control ON/OFF state of a gate of each of the first, second, third, and fourth MOSFETs 221, 222, 223 and 224 constituting the conversion circuit 220 as in FIGS. 4A and 4B to supply AC power at a frequency corresponding to each wireless charging scheme to the first coil 231a or the second coil 232a.

In FIGS. 4A and 4B, the number of MOSFETs, coils and capacitors of, and the configuration and the circuit of the conversion circuit 120 in the smart car 100 may be changed to correspond to the large capacity (e.g., the capacity of several to tens of kW).

Figure 5:
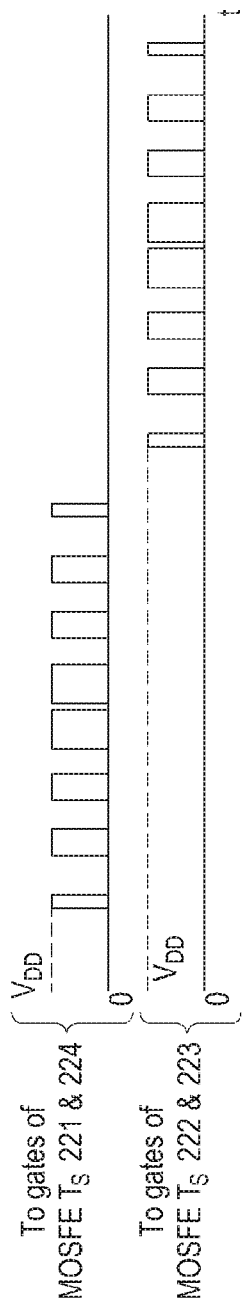
FIG. 5 illustrates input waveforms to MOSFET gates according to various embodiments of the present disclosure.
Figure 6:
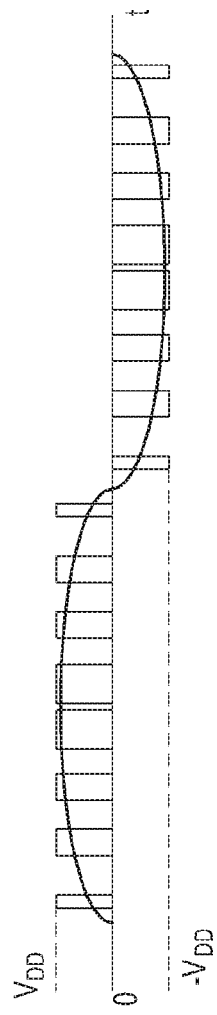
FIG. 6 illustrates an output waveform of a wireless power transceiver according to various embodiments of the present disclosure.

FIG. 5 illustrates input waveforms to MOSFET gates according to various embodiments of the present disclosure, and FIG. 6 illustrates an output waveform of a wireless power transceiver according to various embodiments of the present disclosure. Referring to FIGS. 5 and 6, if a driver waveform of the controller 210 is generated as shown in FIG. 5 and applied appropriately to the gate of each of the first, second, third, and fourth MOSFETs 221, 222, 223 and 224, an AC power output waveform shown in FIG. 6 may be generated in each of the first and second coils 231a and 232a.

In FIGS. 5 and 6, the output waveforms of the wireless power transceiver of the smart car 100 may be changed to correspond to the large capacity (e.g., the capacity of several to tens of kW).

Next, reference will be made to FIGS. 7, 8A and 8B to describe an operation of the wireless power reception mode in the circuit of FIG. 2.

Figure 7:
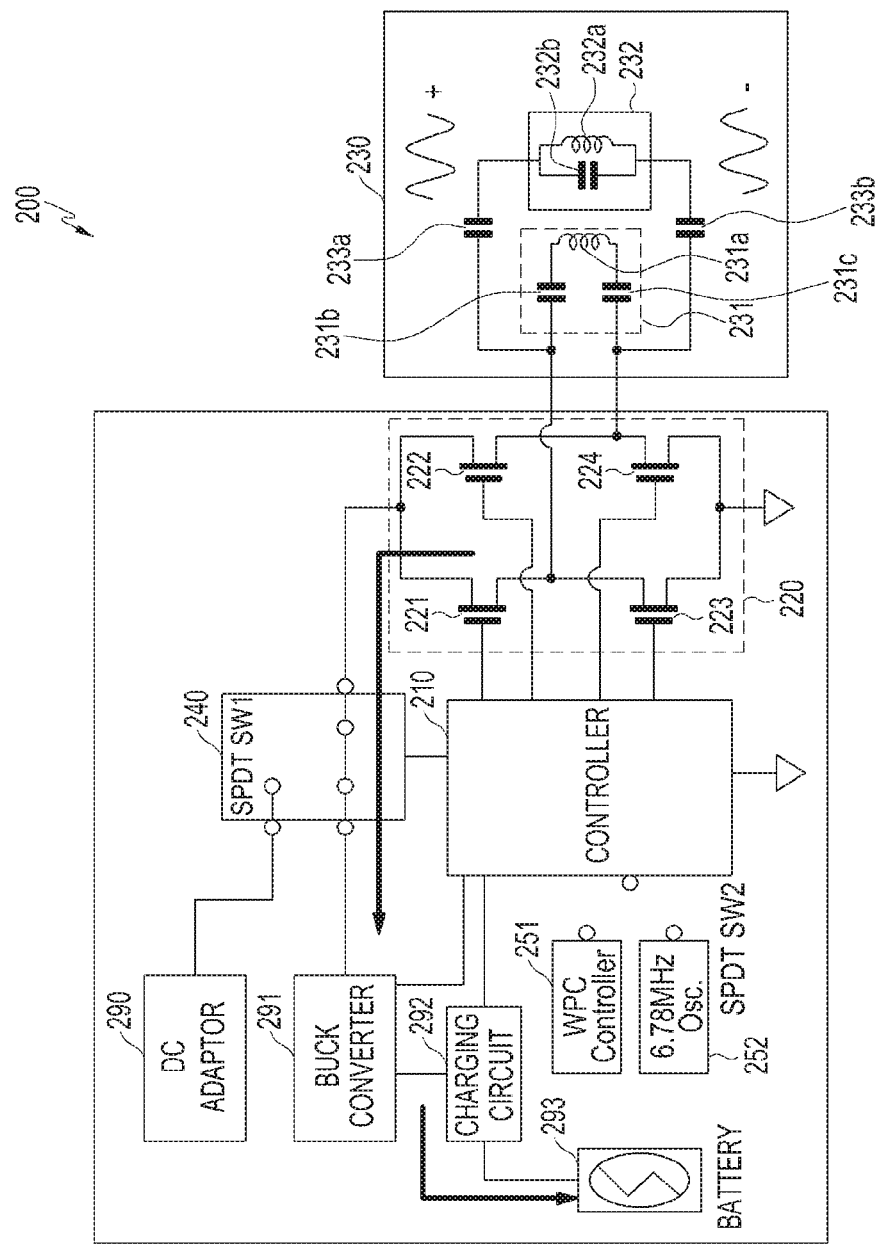
FIG. 7 illustrates a current flow in a wireless power reception mode of an electronic device according to various embodiments of the present disclosure.

FIG. 7 illustrates a current flow in a wireless power reception mode of an electronic device according to various embodiments of the present disclosure. Referring to FIG. 7, if the controller 210 determines that the electronic device 200 should be in the wireless power reception mode in the circuit of FIG. 2, the controller 210 may control the transmission/reception switch 240 to connect or switch the conversion circuit 220 to the buck converter 291.

The conversion circuit 220 may convert AC wireless power received from the wireless power transceiver 230 into DC power and provide the DC power to the buck converter 291. For example, the first, second, third, and fourth MOSFETs 221, 222, 223 and 224 provided in the conversion circuit 220 may constitute a full active rectifier circuit to convert the AC power received through the first and second coils 231a and 232a into DC power.

In FIG. 7, the current flow may be changed in the wireless power reception mode of the smart car 100 to correspond to the large capacity (e.g., the capacity of several to tens of kW).

A detailed operation of the conversion circuit 220 in the wireless power reception mode will be described below with reference to FIGS. 8A and 8B.

Figure 8A:
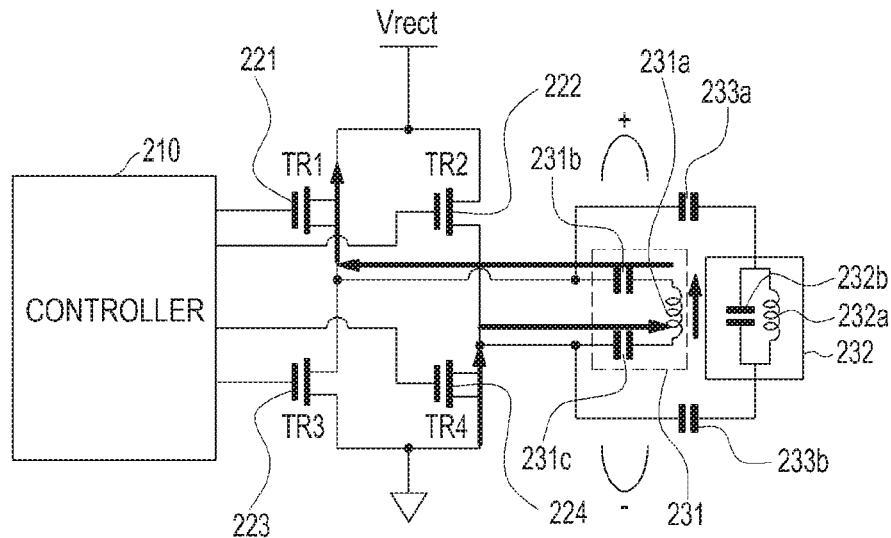
FIGS. 8A and 8B illustrate a detailed current flow in a wireless power reception mode of an electronic device according to various embodiments of the present disclosure.
Figure 8B:
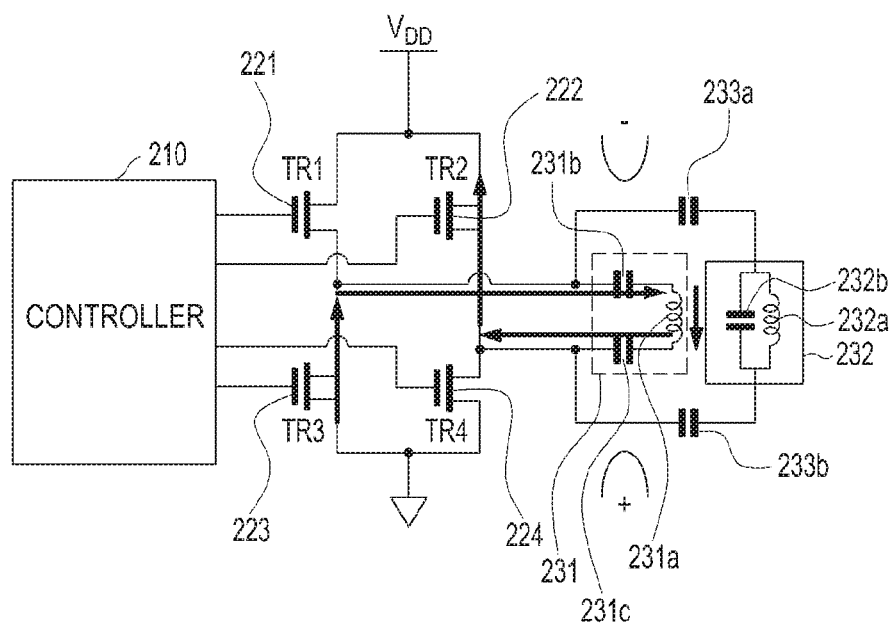

FIGS. 8A and 8B illustrate a detailed current flow in a wireless power reception mode of an electronic device according to various embodiments of the present disclosure.

Referring to FIG. 8A, when a current in the positive direction is induced in the first coil 231a (for example: when the first MOSFET 221 and the fourth MOSFET 224 are turned on), a current may flow in the path of the fourth MOSFET 224, the second capacitor 231c, the first coil 231a, the first capacitor 231b and the first MOSFET 221. Detailed description for the conversion circuit for transmitting and receiving signals will be described with respect to FIGS. 11-14.

Furthermore, referring to FIG. 8B, when a current in the negative direction is induced in the first coil 231a (for example: when the second MOSFET 222 and the third MOSFET 222 are turned on), a current may flow in the path of the third MOSFET 223, the first capacitor 231b, the first coil 231a, the second capacitor 231c and the second MOSFET 222. Detailed description for the conversion circuit for receiving signals will be described with respect to FIGS. 11-14.

As such, when an AC current is induced in the first coil 231a, the AC current supplied to the conversion circuit 220 may be rectified by the first, second, third, and fourth MOSFETs 221, 222, 223 and 224 constituting the conversion circuit 220, and a DC current may be supplied to the transmission/reception switch 240.

Although it is assumed in FIGS. 8A and 8B that an AC current by the induction scheme is induced in the first coil 231a by application of the induction scheme, an AC current by the resonance scheme may flow in the second coil 232a by application of the resonance scheme in the same principle.

In FIGS. 8A and 8B, the detailed current flow may be changed in the wireless power reception mode of the smart car 100 to correspond to the large capacity (e.g., the capacity of several to tens of kW).

Figure 9:
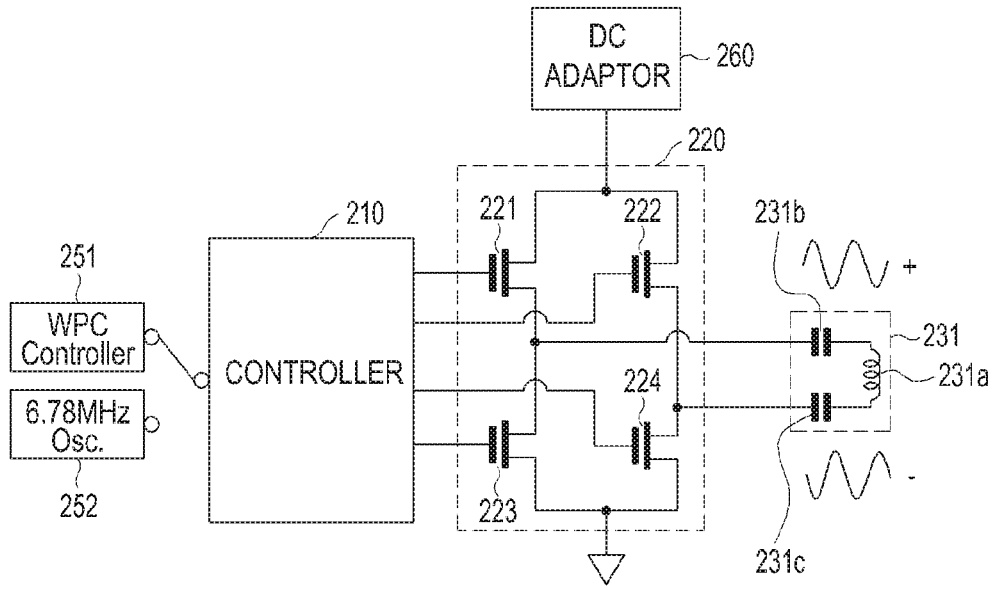
FIGS. 9 and 10 illustrate selection of a wireless charging frequency in a wireless power transmission mode of an electronic device according to various embodiments of the present disclosure.
Figure 10:
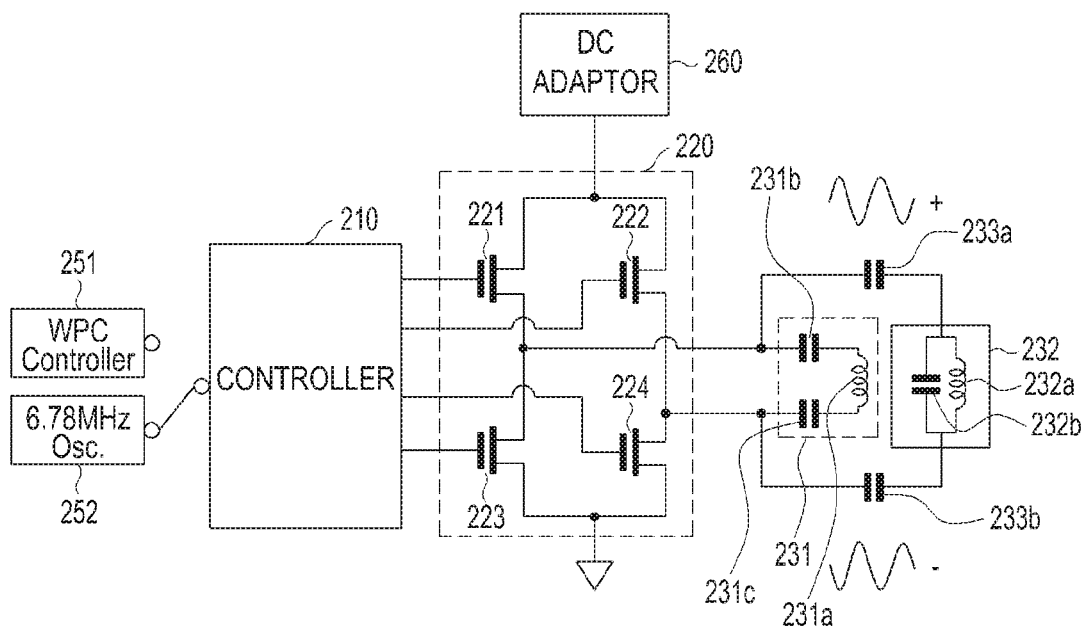

FIGS. 9 and 10 illustrate selection of a wireless charging frequency in a wireless power transmission mode of an electronic device according to various embodiments of the present disclosure.

Referring to FIG. 9, as described above, if the frequency controller 251 (for the induction scheme) is connected to the controller 210, the controller 210 may be provided with a control signal corresponding to the induction scheme by the WPC standard from the frequency controller 251. The controller 210 may control ON/OFF states of a gate of each of the first, second, third, and fourth MOSFETs 221, 222, 223 and 224 in the conversion circuit 220 depending on the control signal corresponding to the induction scheme to output AC power at a frequency corresponding to the induction scheme to the first wireless power transceiver 231. The first wireless power transceiver 231 may wirelessly transmit the AC power at a frequency corresponding to the induction scheme to the receiving electronic device.

Referring to FIG. 10, as described above, if the frequency controller 252 (for the resonant scheme) is connected to the controller 210, the controller 210 may be provided with a frequency signal (e.g., a 6.78 MHz signal) corresponding to the resonance scheme from the frequency controller 252. The controller 210 may control ON/OFF state of a gate of each of the first, second, third, and fourth MOSFETs 221, 222, 223 and 224 in the conversion circuit 220 depending on the control signal corresponding to the resonance scheme to output AC power at a frequency corresponding to the resonance scheme to the second wireless power transceiver 232. The second wireless power transceiver 232 may wirelessly transmit the AC power at a frequency corresponding to the resonance scheme to the receiving electronic device.

Although it is assumed in FIGS. 9 and 10 that the controller 210 is switched to the appropriate frequency controller providing the signals corresponding to the respective wireless charging scheme, a method of selecting a specific wireless charging scheme and generating a control signal may be implemented in various ways. Furthermore, although two wireless charging schemes are given as an example in FIGS. 9 and 10, the present disclosure may be implemented in the same way for three or more wireless charging schemes.

Next, reference will be made to FIGS. 11 to 14 to describe various exemplary circuit configurations in which the conversion circuit can be implemented.

Figure 11:
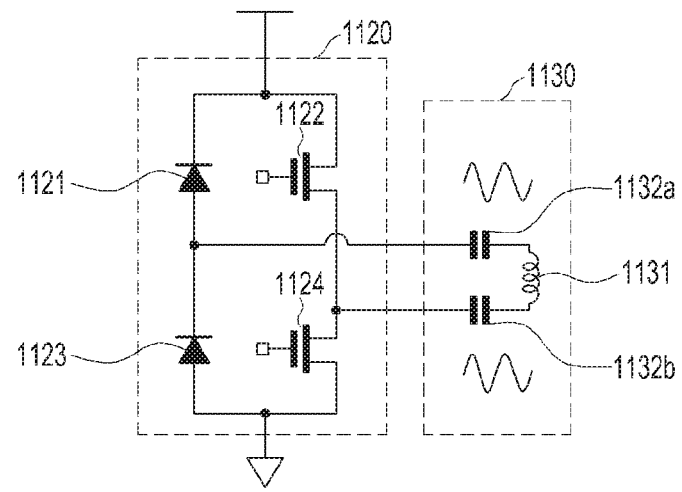
FIG. 11 illustrates an example of a detailed circuit configuration of a conversion circuit according to various embodiments of the present disclosure.

FIG. 11 illustrates an example of a detailed circuit configuration of a conversion circuit according to various embodiments of the present disclosure. Referring to FIG. 11, a conversion circuit 1120 according to various embodiments of the present disclosure for received signals may be implemented with the illustrated circuit using two diodes 1121 and 1123 and two MOSFETs 1122 and 1124.

According to various embodiments of the present disclosure, if the electronic device is in the wireless power reception mode, the conversion circuit 1120 may operate in the same way as the full active rectifier circuit. Furthermore, if the electronic device is in the wireless power transmission mode, the controller may control ON/OFF states of the gates of the two MOSFETs 1122 and 1124 to output AC power to a first wireless power transceiver 1130.

Although it is assumed in FIG. 11 that the first wireless power transceiver 1130 of the induction scheme is connected to the conversion circuit 1120, a second wireless power transceiver of the resonance scheme, together with the first wireless power transceiver 1130 of the induction scheme, may be connected in parallel as described previously. The first wireless power transceiver 1130 may include a coil 1131, and capacitors 1132a and 1132b.

Figure 12:
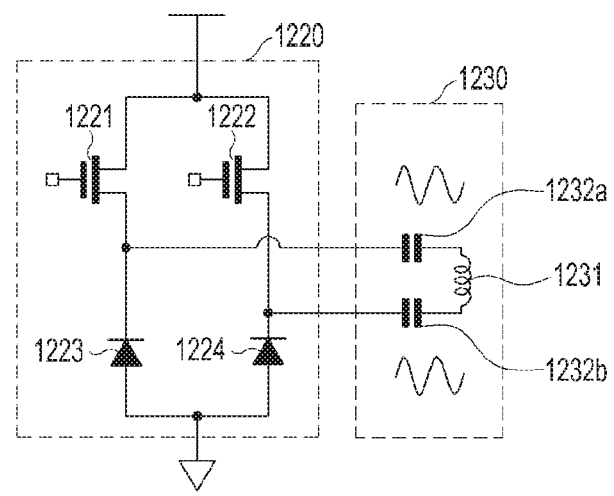
FIG. 12 illustrates another example of a detailed circuit configuration of a conversion circuit according to various embodiments of the present disclosure.

FIG. 12 illustrates another example of a detailed circuit configuration of a conversion circuit according to various embodiments of the present disclosure. Referring to FIG. 12, a conversion circuit 1220 according to various embodiments of the present disclosure may be implemented with the illustrated circuit using two diodes 1223 and 1224 and two MOSFETs 1221 and 1222.

According to various embodiments of the present disclosure, if the electronic device is in the wireless power reception mode, the conversion circuit 1220 may operate in the same way as the full active rectifier circuit. Furthermore, if the electronic device is in the wireless power transmission mode, the controller may control ON/OFF states of the gates of the two MOSFETs 1221 and 1222 to output AC power to a first wireless power transceiver 1230.

Although it is assumed in FIG. 12 that the first wireless power transceiver 1230 of the induction scheme is connected to the conversion circuit 1220, a second wireless power transceiver of the resonance scheme, together with the first wireless power transceiver 1230 of the induction scheme, may be connected in parallel as described previously. The first wireless power transceiver 1230 may include a coil 1231, and capacitors 1232a and 1232b.

Figure 13:
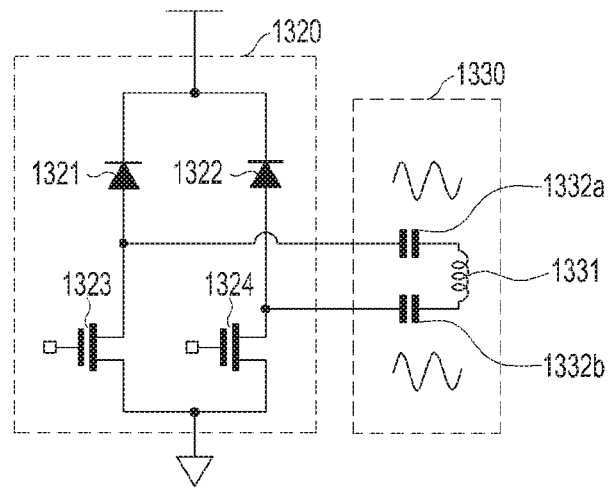
FIG. 13 illustrates further another example of a detailed circuit configuration of a conversion circuit according to various embodiments of the present disclosure.

FIG. 13 illustrates further another example of a detailed circuit configuration of a conversion circuit according to various embodiments of the present disclosure. Referring to FIG. 13, a conversion circuit 1320 according to various embodiments of the present disclosure may be implemented with the illustrated circuit using two diodes 1321 and 1322 and two MOSFETs 1323 and 1324.

According to various embodiments of the present disclosure, if the electronic device is in the wireless power reception mode, the conversion circuit 1320 may operate in the same way as the full active rectifier circuit. Furthermore, if the electronic device is in the wireless power transmission mode, the controller may control ON/OFF states of the gates of the two MOSFETs 1323 and 1324 to output AC power to a first wireless power transceiver 1330.

Although it is assumed in FIG. 13 that the first wireless power transceiver 1330 of the induction scheme is connected to the conversion circuit 1320, a second wireless power transceiver of the resonance scheme, together with the first wireless power transceiver 1330 of the induction scheme, may be connected in parallel as described previously. The first wireless power transceiver 1330 may include a coil 1331, and capacitors 1332a and 1332b.

Figure 14:
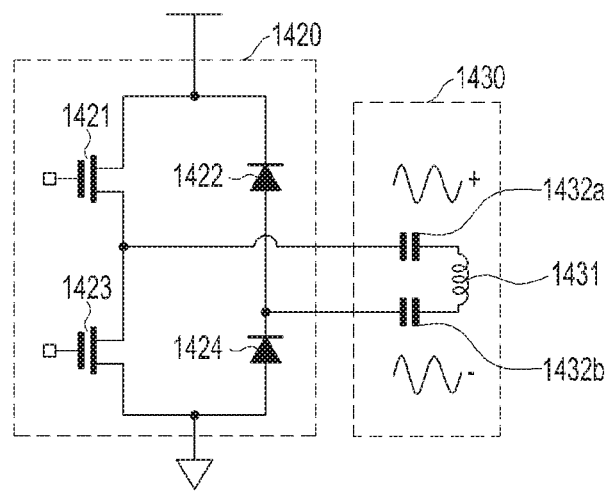
FIG. 14 illustrates yet another example of a detailed circuit configuration of a conversion circuit according to various embodiments of the present disclosure.

FIG. 14 illustrates yet another example of a detailed circuit configuration of a conversion circuit according to various embodiments of the present disclosure. Referring to FIG. 14, a conversion circuit 1420 according to various embodiments of the present disclosure may be implemented with the illustrated circuit using two diodes 1422 and 1424 and two MOSFETs 1421 and 1423.

According to various embodiments of the present disclosure, if the electronic device is in the wireless power reception mode, the conversion circuit 1420 may operate in the same way as the full active rectifier circuit. Furthermore, if the electronic device is in the wireless power transmission mode, the controller may control ON/OFF states of the gates of the two MOSFETs 1421 and 1423 to output AC power to a first wireless power transceiver 1430.

Although it is assumed in FIG. 14 that the first wireless power transceiver 1430 of the induction scheme is connected to the conversion circuit 1420, a second wireless power transceiver of the resonance scheme, together with the first wireless power transceiver 1430 of the induction scheme, may be connected in parallel as described previously. The first wireless power transceiver 1430 may include a coil 1431, and capacitors 1432a and 1432b.

FIGS. 15A to 15E are flowcharts illustrating a wireless charging procedure in an electronic device according to various embodiments of the present disclosure.

Figure 15A:
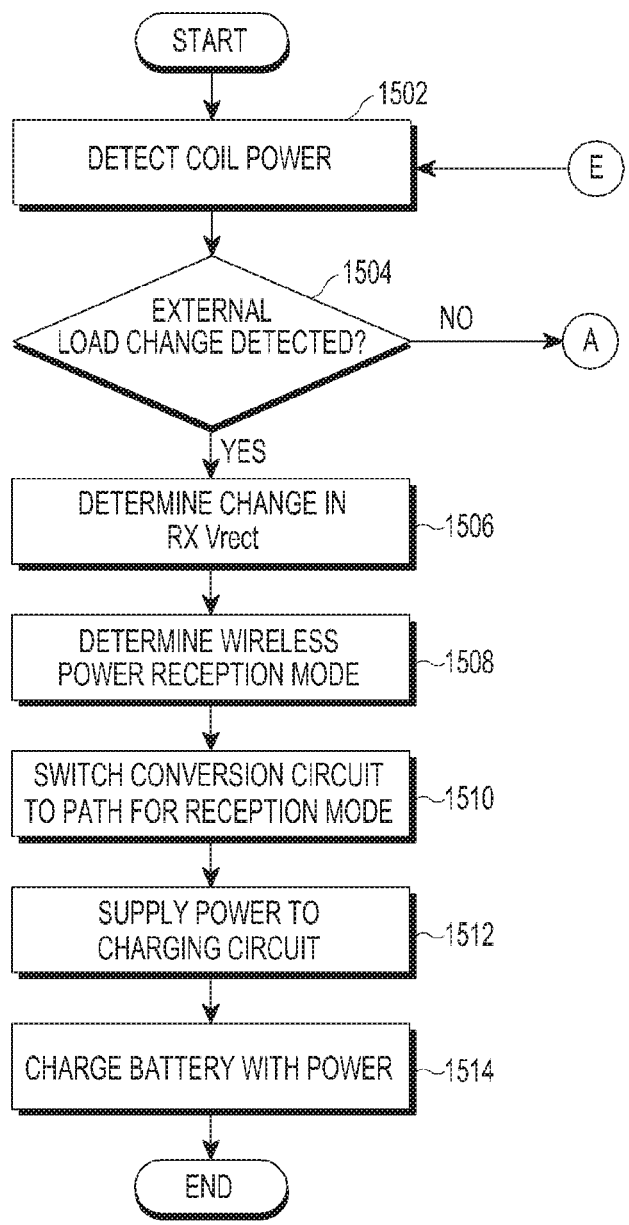
FIGS. 15A, 15B, 15C, 15D, and 15E are flowcharts illustrating a wireless charging procedure in an electronic device according to various embodiments of the present disclosure.

Referring to FIG. 15A, in operation 1502, a controller of the electronic device may detect power induced in a coil of a wireless power transceiver by means of a sensor unit. If a load change by an external electronic device is detected by the coil power detection in operation 1504, the controller may determine a change in a Vrect value rectified in a conversion circuit in operation 1506.

If the controller determines the wireless power reception mode in operation 1508 by determining the change in the Vrect value, the controller may switch the conversion circuit to a path corresponding to the wireless power reception mode in operation 1510. For example, as described above, in FIG. 1, the controller may switch the path of the conversion circuit 120 to the voltage converter 191.

According to the wireless power reception mode, the controller may supply the power to a charging circuit in operation 1512, and charge a battery with the power supplied to the charging circuit in operation 1514.

If the external load change is not detected in operation 1504, the controller may determine in operation 1516 whether the load change is made by a foreign object. If it is determined that the power induced in the coil is caused by a foreign object, the controller may perform a preset error handling operation in operation 1530.

On the other hand, if it is determined in operation 1518 that the power induced in the coil is not caused by a foreign object, the controller may determine in-band communication for wireless power transmission in operation 1520.

As a result of determining the in-band communication, if the controller determines the wireless power transmission mode of the induction scheme in operation 1522, the controller may switch the conversion circuit to the path corresponding to the wireless power transmission mode in operation 1524. For example, as described above, in FIG. 1, the controller may switch the path of the conversion circuit 120 to the power supply 160.

As the wireless power transmission mode by the induction scheme is determined, the controller may supply power to the conversion circuit in operation 1526, and operate in the wireless power transmission mode of the induction scheme in operation 1528.

Figure 15B:
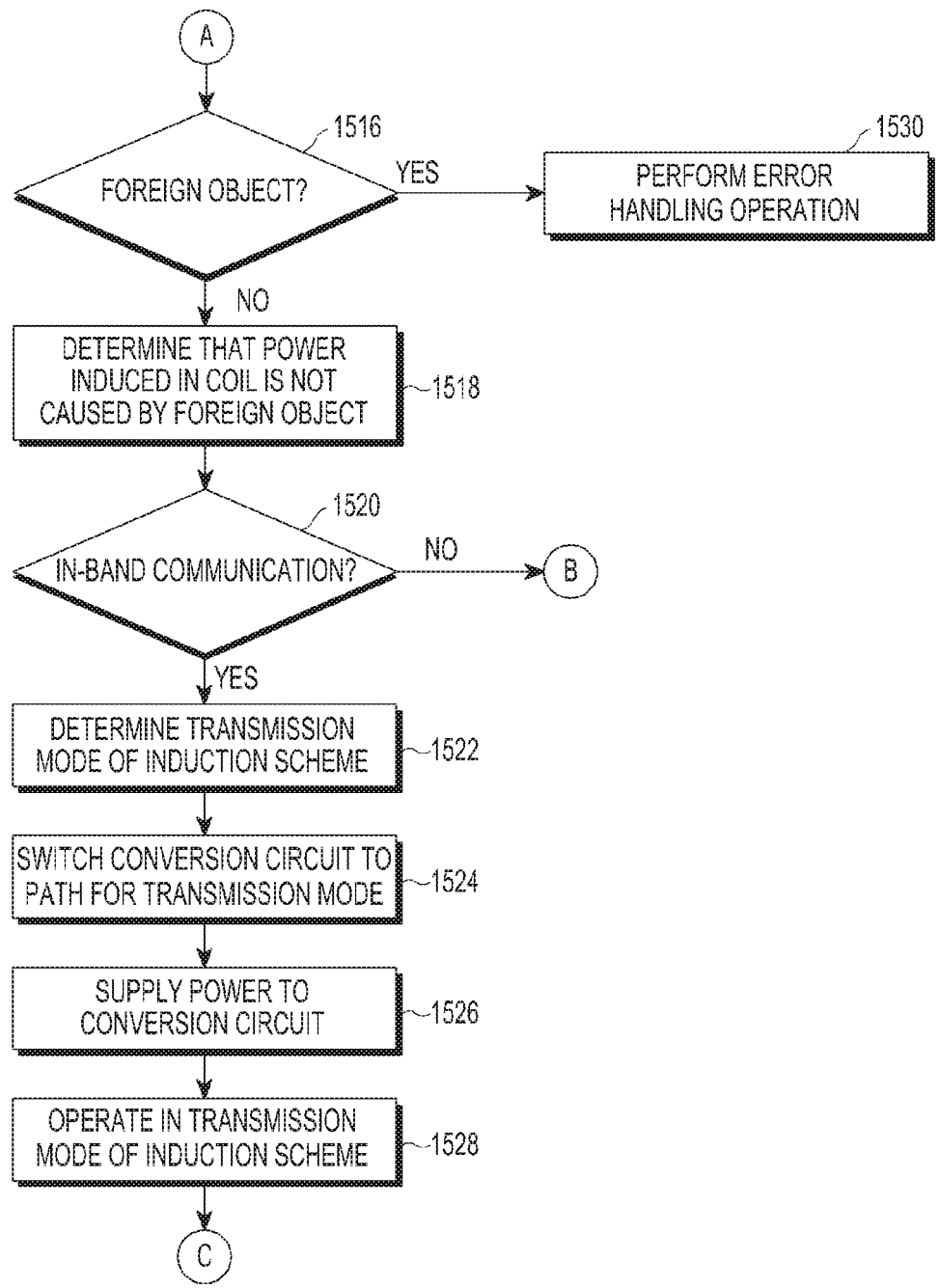
Figure 15C:
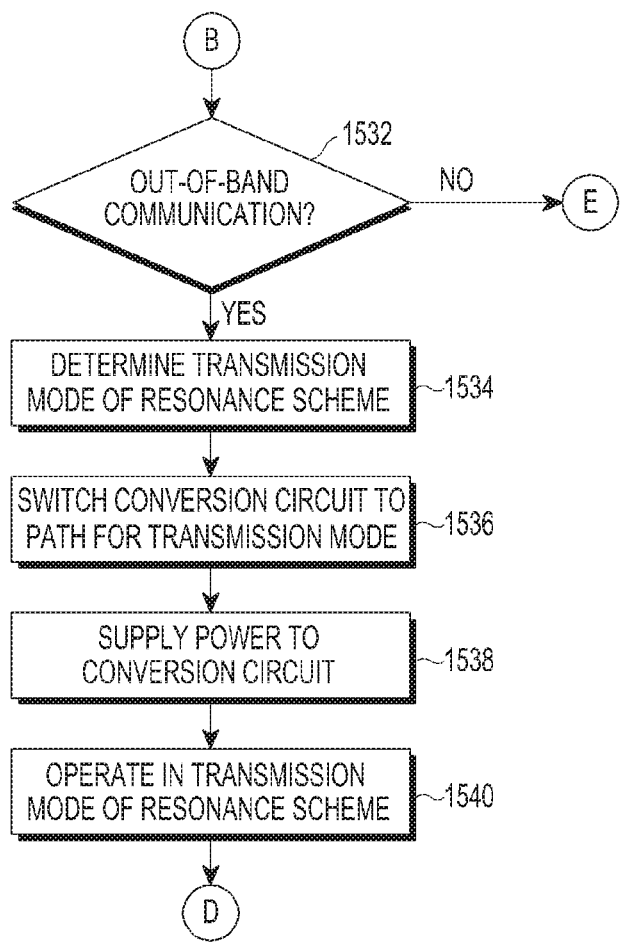

If the wireless charging scheme is not determined by the in-band communication in operation 1520, the controller may determine out-of-band communication in operation 1532 of FIG. 15C. As a result of determining out-of-band communication, if the controller determines the wireless power transmission mode of the resonance scheme in operation 1534, the controller may switch the conversion circuit to the path corresponding to the wireless power transmission mode in operation 1536. For example, as described above, in FIG. 1, the controller may switch the path of the conversion circuit 120 to the power supply 160.

As the wireless power transmission mode by the resonance scheme is determined, the controller may supply power to the conversion circuit in operation 1538, and operate in the wireless power transmission mode of the resonance scheme in operation 1540.

Figure 15D:
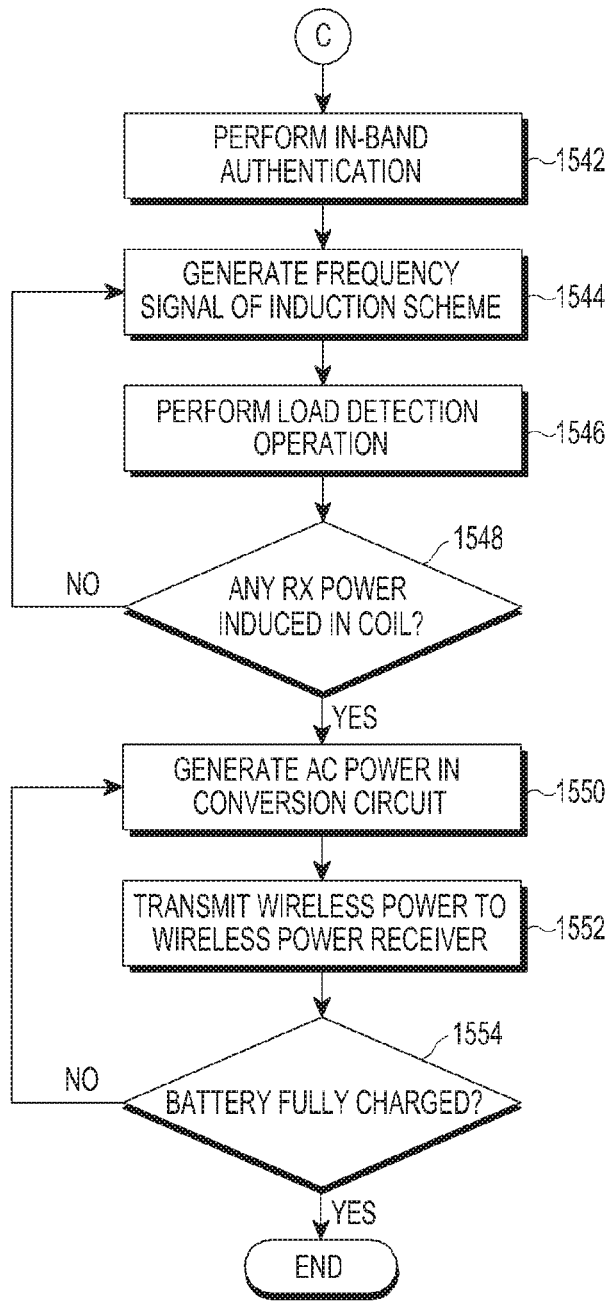

If the controller operates in the wireless power transmission mode of the induction scheme in operation 1528 of FIG. 15B, the controller may perform in-band authentication for the receiving electronic device that the controller desires to charge, in operation 1542 of FIG. 15D. The controller may generate a frequency signal of the induction scheme in operation 1544, and perform a load detection operation using a coil of the electronic device in operation 1546.

If the presence of an electronic device of the induction scheme is determined using a coil of the electronic device in operation 1548, the controller may generate AC power corresponding to the induction scheme in the conversion circuit in operation 1550, and transmit wireless power to the receiving electronic device (i.e., a wireless power receiver) in operation 1552. The controller may determine in operation 1554 whether the battery of the receiving electronic device is fully charged, and proceed with the wireless power transmission procedure until the battery is fully charged.

Figure 15E:
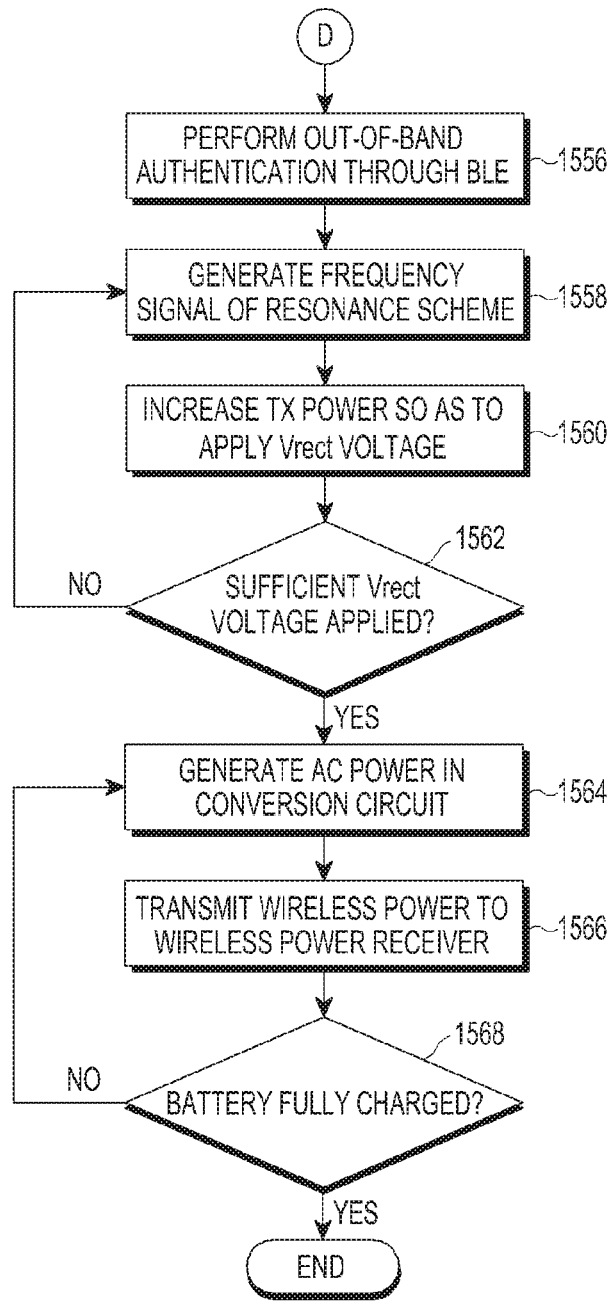

If the controller operates in the wireless power transmission mode of the resonance scheme in operation 1540 of FIG. 15C, the controller may perform out-of-band authentication for the receiving electronic device that the controller desires to charge by, for example, Bluetooth low energy (BLE) communication in operation 1556 of FIG. 15E. The controller may generate a frequency signal of the resonance scheme in operation 1558, and increase the transmission power so as to apply a Vrect voltage in operation 1560.

The controller determines in operation 1562 whether a sufficient Vrect voltage is applied to the receiving electronic device, and if sufficient Vrect voltage is applied, the controller may generate AC power corresponding to the resonance scheme to the conversion circuit in the conversion circuit in operation 1564, and transmit wireless power to the receiving electronic device (i.e., a wireless power receiver) in operation 1566. The controller may determine in operation 1568 whether the battery of the receiving electronic device is fully charged, and proceed with the wireless power transmission procedure until the battery is fully charged.

At least one of the operations illustrated in FIGS. 15A to 15E may be omitted in execution, and at least one other operation may be added between the operations. Furthermore, the operations illustrated in FIGS. 15A to 15E may be processed in the order shown, and the execution order of at least one operation may be exchanged with the execution order of another operation.

A method for wireless charging in an electronic device according to any one of various embodiments of the present disclosure may include determining a wireless power transmission mode or a wireless power reception mode if at least one electronic device is detected; determining a wireless power transmission frequency supportable in the detected electronic device among a plurality of transmittable wireless power transmission frequencies if the wireless power transmission mode is determined; converting direct current (DC) power into alternating current (AC) power based on a control signal corresponding to the determined wireless power transmission frequency; and transmitting the converted AC power to a wireless space.

According to various embodiments of the present disclosure, the method may further include detecting power applied to a coil of the electronic device; and detecting a load change of an external electronic device from the detected power.

According to various embodiments of the present disclosure, the method may further include determining the wireless power reception mode if the detected load change of the external electronic device meets a preset condition.

According to various embodiments of the present disclosure, the method may further include converting AC power applied to the coil into DC power; and charging a battery with the converted DC power.

According to various embodiments of the present disclosure, the wireless power transmission frequency may include at least one of a frequency corresponding to a resonance scheme, a frequency corresponding to an induction scheme, or a frequency corresponding to a radio wave radiation scheme.

According to various embodiments of the present disclosure, determining the supportable wireless power transmission frequency may include determining the supportable wireless power transmission frequency using in-band communication by a coil for transmitting and receiving wireless power.

According to various embodiments of the present disclosure, determining the supportable wireless power transmission frequency may include determining the supportable wireless power transmission frequency using out-of-band communication by a communication unit that provides short-range wireless communication with the detected electronic device.

According to various embodiments of the present disclosure, determining the supportable wireless power transmission frequency may include determining the supportable wireless power transmission frequency using in-band communication by a coil for transmitting and receiving wireless power; and determining the supportable wireless power transmission frequency using out-of-band communication by a communication unit that provides short-range wireless communication with the detected electronic device, if the supportable wireless power transmission frequency is not determined through the in-band communication.

According to various embodiments of the present disclosure, determining the supportable wireless power transmission frequency may include transmitting and receiving a signal according to a communication protocol of an induction scheme; and transmitting and receiving a signal according to a communication protocol of a resonance scheme.

According to various embodiments of the present disclosure, determining the supportable wireless power transmission frequency may include simultaneously transmitting a signal according to a communication protocol of an induction scheme and a signal according to a communication protocol of a resonance scheme.

FIG. 16 is a block diagram 1600 of an electronic device 1601 according to various embodiments of the present disclosure. The electronic device 1601 may include the whole or a part of, for example, the electronic device 100 shown in FIG. 1. The electronic device 1601 may include at least one application processor (AP) 1610, a communication module 1616, a subscriber identification module (SIM) card 1624, a memory 1630, a sensor module 1640, an input device 1650, a display 1660, an interface 1670, an audio module 1680, a camera module 1691, a power management module 1695, a battery 1696, an indicator 1697, and a motor 1698.

The AP 1610 may control a plurality of hardware or software components by running, for example, an operating system or application program(s), and may process and calculate various data. The AP 1610 may be the same as or similar to the controller 110 in FIG. 1 in terms of configuration. The AP 1610 may be implemented with, for example, a system on chip (SoC). In one embodiment, the AP 1610 may further include a graphic processing unit (GPU) and/or an image signal processor. The AP 1610 may include at least some (e.g., a cellular module 1621) of the components shown in FIG. 16. The AP 1610 may load in volatile memory of the memory 1630, a command or data received from at least one of other components (e.g., a non-volatile memory of the memory 1630) and process the loaded data, and may store a variety of data in a non-volatile memory.

The communication module 1620 may include, for example, the cellular module 1621, a WiFi module 1623, a Bluetooth (BT) module 1625, a GPS module 1627, a near field communication (NFC) module 1628, and a radio frequency (RF) module 1629.

The cellular module 1621 may, for example, provide a voice call service, a video call service, a messaging service or an Internet service over a communication network. In one embodiment, the cellular module 1621 may perform identification and authentication by the electronic device 1601 within the communication network using a subscriber identification module (e.g., the SIM card 1624). In one embodiment, the cellular module 1621 may have some of the functions that can be provided by the AP 1610. In one embodiment, the cellular module 1621 may include a communication processor (CP).

Each of the WiFi module 1623, the BT module 1625, the GPS module 1627 and/or the NFC module 1628 may include, for example, a processor for processing the data transmitted or received through the corresponding module. In some embodiments, at least some (e.g., two or more) of the cellular module 1621, WiFi module 1623, the BT module 1625, the GPS module 1627 or the NFC module 1628 may be included in one integrated chip (IC) or IC package.

The RF module 1629 may, for example, transmit and receive communication signals (e.g., RF signals). The RF module 1629 may include, for example, a transceiver, a power amplifier module (PAM), a frequency filter, a low noise amplifier (LNA), and/or an antenna. In another embodiment, at least one of the cellular module 1621, the WiFi module 1623, the BT module 1625, the GPS module 1627 and/or the NFC module 1628 may transmit and receive RF signals through a separate RF module.

The SIM card 1624 may include, for example, a card with a subscriber identification module and/or an embedded SIM. The SIM card 1624 may include unique identification information (e.g., integrated circuit card identifier (ICCID)) and/or subscriber information (e.g., international mobile subscriber identity (IMSI)).

The memory 1630 may include, for example, an internal memory 1632 and/or an external memory 1634. The internal memory 1632 may include at least one of, for example, volatile memory (e.g., dynamic RAM (DRAM), static RAM (SRAM), synchronous dynamic RAM (SDRAM) or the like) or non-volatile memory (e.g., one time programmable ROM (OTPROM), programmable ROM (PROM), erasable and programmable ROM (EPROM), electrically erasable and programmable ROM (EEPROM), mask ROM, flash ROM, flash memory (e.g., a NAND flash, a NOR flash or the like), hard drive, or solid state drive (SSD)).

The external memory 1634 may further include a flash drive, for example, compact flash (CF), secure digital (SD), micro secure digital (Micro-SD), mini secure digital (Mini-SD), extreme digital (xD), a memory stick or the like. The external memory 1634 may be functionally and/or physically connected to the electronic device 1601 through various interfaces.

The sensor module 1640 may, for example, measure the physical quantity or detect the operating status of the electronic device 1601, and convert the measured or detected information into an electrical signal. The sensor module 1640 may include, for example, a gesture sensor 1640A, a gyro sensor 1640B, a barometer 1640C, a magnetic sensor 1640D, an accelerometer 1640E, a grip sensor 1640F, a proximity sensor 1640G, a color sensor (e.g., red, green, blue (RGB) sensor) 1640H, a biosensor 16401, a temperature/humidity sensor 1640J, an illuminance sensor 1640K, and/or a ultra violet (UV) sensor 1640M. Additionally or alternatively, the sensor module 1640 may include, for example, an E-nose sensor, an electromyography (EMG) sensor, an electroencephalogram (EEG) sensor, an electrocardiogram (ECG) sensor, an infrared (IR) sensor, an iris sensor and/or a fingerprint sensor. The sensor module 1640 may further include a control circuit for controlling at least one or more sensors belonging thereto. In some embodiments, the electronic device 1601 may further include a processor configured to control the sensor module 1640, separately or as a part of the AP 1610, making it possible to control the sensor module 1640 while the AP 1610 is in a sleep state.

The input device 1650 may include, for example, a touch panel 1652, a (digital) pen sensor 1654, a key 1656, and/or an ultrasonic input device 1658. The touch panel 1652 may use at least one of, for example, capacitive, resistive, infrared and ultrasonic schemes. Furthermore, the touch panel 1652 may further include a control circuit. The touch panel 1652 may further include a tactile layer, to provide a tactile or haptic feedback to the user.

The (digital) pen sensor 1654, for example, may be a part of the touch panel 1652, or may include a separate recognition sheet. The key 1656 may include, for example, a physical button, an optical key and/or a keypad. The ultrasonic input device 1658 may check data by detecting sound waves with a microphone (e.g., a microphone 1688) in the electronic device 1601 using an input tool for generating an ultrasonic signal.

The display 1660 may include a panel 1662, a hologram device 1664, or a projector 1666. The panel 1662 may be implemented to be, for example, flexible, transparent or wearable. The panel 1662, together with the touch panel 1652, may be implemented as one module in some embodiments. The hologram device 1664 may show stereoscopic images in the air using interference of light. The projector 1666 may display images by projecting light on the screen. The screen, for example, may be disposed inside or outside of the electronic device 1601. In one embodiment, the display 1660 may further include a control circuit for controlling the panel 1662, the hologram device 1664 or the projector 1666.

The interface 1670 may include, for example, a high-definition multimedia interface (HDMI) 1672, a universal serial bus (USB) 1674, an optical interface 1676 and/or D-subminiature (D-sub) 1678. Additionally or alternatively, the interface 1670 may include, for example, a mobile high-definition link (MHL) interface, a secure digital (SD) card/multi-media card (MMC) interface, an infrared data association (IrDA) interface, and the like.

The audio module 1680, for example, may convert sound and electrical signals bi-directionally. The audio module 1680, for example, may process the sound information that is received or output through a speaker 1682, a receiver 1684, an earphone 1686 or a microphone 1688.

The camera module 1691 is, for example, a device capable of capturing still images and videos. In one embodiment, the camera module 1691 may include one or more image sensors (e.g., a front image sensor and/or a rear image sensor), a lens, an image signal processor (ISP), and/or a flash (e.g., an LED or xenon lamp).

The power management module 1695, for example, may manage power of the electronic device 1601. In one embodiment, the power management module 1695 may include, for example, a power management integrated circuit (PMIC), a charger integrated circuit (IC), and/or a battery gauge. The PMIC may support wired and/or wireless charging scheme. The wireless charging scheme may be, for example, the resonance scheme, the induction scheme, and the radio wave (e.g., RF/microwave) radiation scheme, and the power management module 1695 may further include additional circuits (e.g., a coil loop, a resonant circuit, a rectifier or the like) for wireless charging. The battery gauge may, for example, measure the remaining capacity, charging voltage, charging current or temperature of the battery 1696. The battery 1696 may be, for example, a rechargeable battery and/or a solar battery.

The indicator 1697 may indicate specific status (e.g., boot status, message status, charging status or the like) of the electronic device 1601 or a part (e.g. the AP 1610) thereof. The motor 1698 may convert an electrical signal into mechanical vibrations, thereby generating a vibration or haptic effect. Although not shown, the electronic device 1601 may include a processing device (e.g., GPU) for mobile TV support. The processing device for mobile TV support may process media data that is based on the standards such as, for example, digital multimedia broadcasting (DMB), digital video broadcasting (DVB) or mediaFLO™.

Each of above-described components of the electronic device 1601 may be configured with one or more components, names of which may vary depending on the type of the electronic device 1601. In various embodiments, the electronic device 1601 may include at least one of the above-described components, some of which may be omitted, or may further include additional other components. Furthermore, some of the components of the electronic device 1601 according to various embodiments of the present disclosure may be configured as one entity by being combined to perform the previous functions of the components in the same manner.

Figure 17:
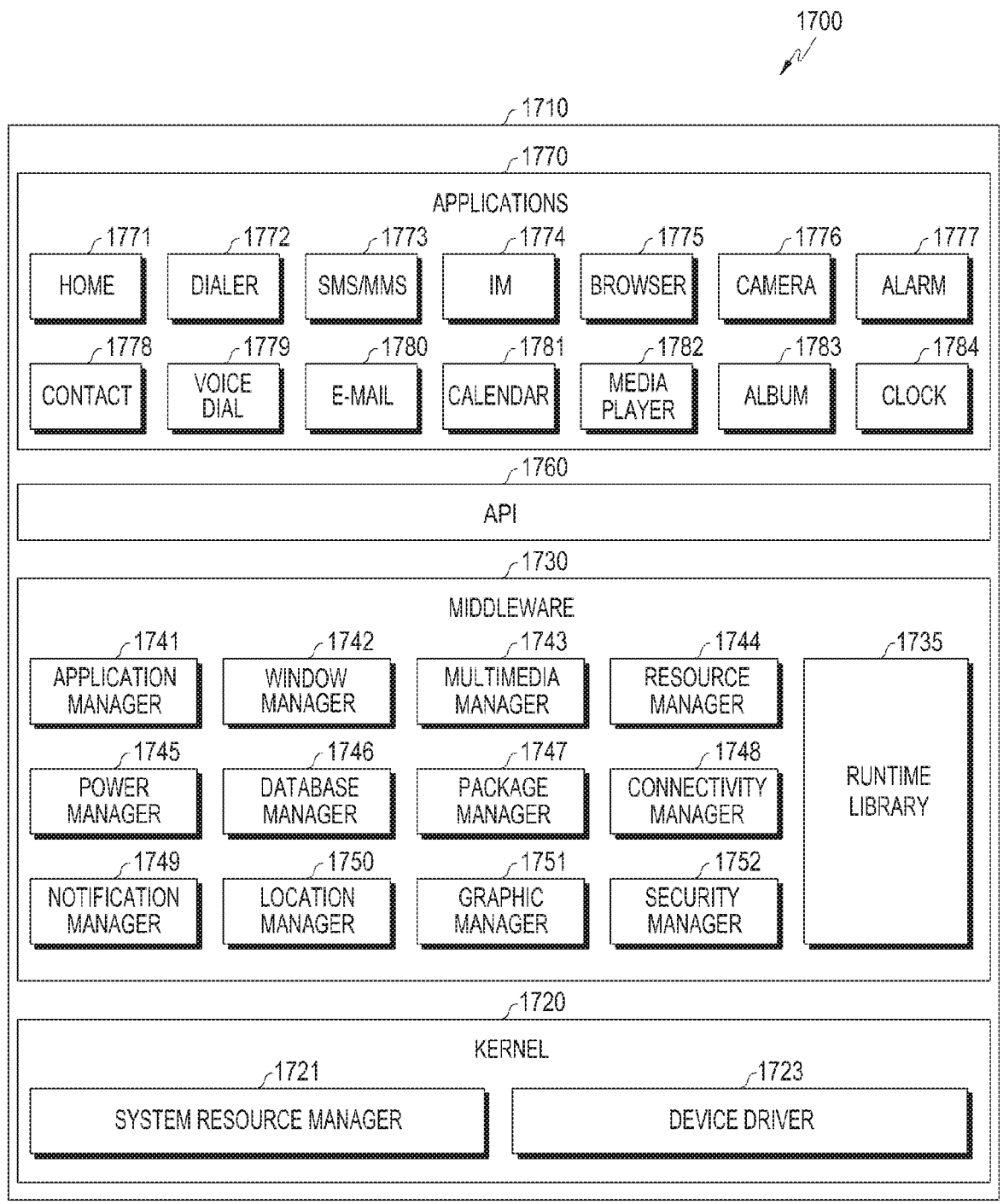
FIG. 17 is a block diagram of a program module according to various embodiments of the present disclosure.

FIG. 17 is a block diagram 1700 of a program module 1710 according to various embodiments of the present disclosure. In one embodiment, the program module 1710 may include an operating system (OS) for controlling the resources related to an electronic device, and/or a variety of applications (e.g., an application program) that run on the operating system. The operating system may be, for example, Android™, iOS™, Windows™, Symbian™, Tizen™, Bada™ or the like.

The program module 1710 may include a kernel 1720, a middleware 1730, an application programming interface (API) 1760, and/or application(s) 1770. At least a part of the program module 1710 may be preloaded on the electronic device, or downloaded from a server.

The kernel 1720 may include, for example, a system resource manager 1721 or a device driver 1723. The system resource manager 1721 may control, allocate or recover the system resources. In one embodiment, the system resource manager 1721 may include a process manager, a memory manager, a file system manager or the like. The device driver 1723 may include, for example, a display driver, a camera driver, a Bluetooth driver, a shared memory driver, a USB driver, a keypad driver, a WiFi driver, an audio driver, or an inter-process communication (IPC) driver.

The middleware 1730, for example, may provide a function that is required in common by the application(s) 1770, or may provide various functions to the application 1770 through the API 1760 so that the application 1770 may efficiently use the limited system resources within the electronic device. In one embodiment, the middleware 1730 may include at least one of a runtime library 1735, an application manager 1741, a window manager 1742, a multimedia manager 1743, a resource manager 1744, a power manager 1745, a database manager 1746, a package manager 1747, a connectivity manager 1748, a notification manager 1749, a location manager 1750, a graphic manager 1751, or a security manager 1752.

The runtime library 1735 may include, for example, a library module that a compiler uses to add a new function through a programming language while the application 1770 is run. The runtime library 1735 may perform an input/output (I/O) management function, a memory management function, an arithmetic function or the like.

The application manager 1741 may, for example, manage the life cycle of at least one of the application(s) 1770. The window manager 1742 may manage graphic user interface (GUI) resources that are used on the screen. The multimedia manager 1743 may determine the format required for playback of various media files, and encode or decode the media files using a codec for the format. The resource manager 1744 may manage resources such as source code, memory or storage space for any one of the application(s) 1770.

The power manager 1745, for example, may manage the battery or power by operating with the basic input/output system (BIOS), and provide power information required for operation of the electronic device. The database manager 1746 may create, search or update the database that is to be used by at least one of the application(s) 1770. The package manager 1747 may manage installation or update of applications that are distributed in the form of a package file.

The connectivity manager 1748, for example, may manage wireless connection such as WiFi or Bluetooth. The notification manager 1749 may indicate or notify events such as message arrival, appointments and proximity in a manner that doesn't interfere with the user. The location manager 1750 may manage the location information of the electronic device. The graphic manager 1751 may manage the graphic effect to be provided to the user, or the user interface related thereto. The security manager 1752 may provide various security functions required for the system security or user authentication. In one embodiment, if the electronic device (e.g., the electronic device 100 in FIG. 1) includes a phone function, the middleware 1730 may further include a telephony manager for managing the voice or video call function of the electronic device.

The middleware 1730 may include a middleware module that forms a combination of various functions of the above-described components. The middleware 1730 may provide a module specialized for the type of the operating system in order to provide a differentiated function. Furthermore, the middleware 1730 may dynamically remove some of the existing components, or add new components.

The API 1760, for example, is a set of API programming functions, and may be provided in a different configuration depending on the operating system. For example, for Android™ or iOS™, the API 1760 may provide one API set per platform, and for Tizen™, the API 1760 may provide two or more API sets per platform.

The application 1770 may include, for example, one or more applications capable of providing functions such as a home 1771, a dialer 1772, a short message service/multimedia messaging service (SMS/MMS) 1773, an instant message (IM) 1774, a browser 1775, a camera 1776, an alarm 1777, a contact 1778, a voice dial 1779, an Email 1780, a calendar 1781, a media player 1782, an album 1783, a clock 1784, healthcare (e.g., for measuring the quantity of exercise, blood glucose or the like), or environmental information provision (e.g., for providing information about atmospheric pressure, humidity, temperature or the like).

In one embodiment, the application 1770 may include an application for supporting information exchange between the electronic device (e.g., the electronic device 100 in FIG. 1) and external electronic devices. This application may be referred to as an "information exchange application" for convenience of description. The information exchange application may include, for example, a notification relay application for delivering specific information to the external electronic devices, or a device management application for managing the external electronic devices.

For example, the notification relay application may include a function of delivering notification information generated in other applications (e.g., an SMS/MMS application, an Email application, a healthcare application, an environmental information application or the like) of the electronic device, to the external electronic devices. Furthermore, the notification relay application may, for example, receive notification information from an external electronic device, and provide the received notification information to the user. The device management application may, for example, manage at least one function (e.g., a function to turn-on/off the external electronic device itself or some components thereof, or the brightness (or the resolution) of the display) of the external electronic device communicating with the electronic device, and may manage (e.g., install, delete or update) an application operating in the external electronic device or a service (e.g., a call service or a messaging service) provided in the external electronic device.

In one embodiment, the application 1770 may include an application (e.g., a healthcare application) that is specified depending on the attributes (e.g., the attributes of an electronic device that is a mobile medical device) of the external electronic device. In one embodiment, the application 1770 may include an application received or downloaded from the external electronic device. In one embodiment, the application 1770 may include a preloaded application or a third party application that can be downloaded from the server. The names of the components of the illustrated program module 1710 may vary depending on the type of the operating system.

In various embodiments, at least a part of the program module 1710 may be implemented by software, firmware, hardware or a combination thereof. At least a part of the program module 1710 may be executed by, for example, a processor (e.g., the AP 1610). At least a part of the program module 1710 may include, for example, a module, a program, a routine, an instruction set and/or a process for performing one or more functions.

The term "module" or "function unit" as used herein may refer to a unit that includes, for example, hardware, software and/or firmware. The term "module" or "function unit" may be interchangeably used with terms such as, for example, unit, logic, logical block, component, or circuit. The "module" or "function unit" may be a minimum unit of an integrally constructed part, or a part thereof. The "module" or "function unit" may be the minimum unit for performing one or more functions, or a part thereof. The "module" or "function unit" may be implemented mechanically or electronically. For example, the "module" or "function unit" may include an application-specific integrated circuit (ASIC) chip, field-programmable gate arrays (FPGAs), and/or a programmable-logic device, which are known or will be developed in the future, and which perform certain operations.

At least a part of the apparatus (e.g., modules or functions thereof) or method (e.g., operations) according to various embodiments of the present disclosure may be implemented by a command that is stored in computer-readable storage media in the form of, for example, a programming module. If the command is executed by one or more processors (e.g., the controller 110), the one or more processors may perform a function corresponding to the command. The computer-readable storage media may be, for example, a storage unit.

The computer-readable storage media may include magnetic media (e.g., a hard disk, a floppy disk, and magnetic tape), optical media (e.g., a compact disc read only memory (CD-ROM) and a digital versatile disc (DVD)), magneto-optical media (e.g., a floptical disk), and a hardware device (e.g., read only memory (ROM), random access memory (RAM) or flash memory). The program command may include not only a machine code such as compiled code, but also a high-level language code that can be executed by the computer using an interpreter. The above-described hardware device may be configured to operate as one or more software modules to perform the operations according to various embodiments of the present disclosure, and vice versa.

A module or a program module according to various embodiments of the present disclosure may include at least one of the above-described components, some of which may be omitted, or may further include additional other components. Operations performed by a module, a program module or other components according to various embodiments of the present disclosure may be performed in a sequential, parallel, iterative or heuristic way. Some operations may be performed in a different order or omitted, or other operations may be added.

According to various embodiments of the present disclosure, in a storage medium storing instructions, when the instructions are executed by at least one processor, the instructions are set to allow at least one processor to perform at least one operation. The operation(s) may include determining a wireless power transmission mode or a wireless power reception mode if at least one electronic device is detected; determining a wireless power transmission frequency supported by the detected electronic device from among a plurality of wireless power transmission frequencies if the wireless power transmission mode is determined; and generating a control signal corresponding to the determined wireless power transmission frequency.

As is apparent from the foregoing description, an electronic device and a method for wireless charging in the electronic device according to various embodiments of the present disclosure may implement, into a single circuit, a transmitter for generating AC power to transmit wireless charging power and a receiver for generating DC power from the received wireless power, thereby contributing to miniaturization and reduced cost of the electronic device.

Furthermore, an electronic device and a method for wireless charging in the electronic device according to various embodiments of the present disclosure may implement or configure a coil for transmitting and receiving wireless power with an integrated coil so as to support a plurality of standards for the resonance scheme and the induction scheme, and may selectively transmit wireless charging power according to each standard depending on the control signal from a controller.

While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

What is claimed is:

1. An electronic device comprising: a battery; a wireless power transceiver comprising at least one coil; a controller configured to: receive, through the wireless power transceiver, a signal from an external electronic device, and based at least in part on the received signal, identify a wireless charging scheme supported by the external electronic device from among at least two wireless charging schemes, wherein the at least two wireless charging schemes comprise a first scheme corresponding to a first standard and a second scheme corresponding to a second standard; and a full bridge circuit comprising a plurality of transistors and configured to operate in a multi-mode comprising at least: a reception mode for receiving power from the wireless power transceiver, a first transmission mode for transmitting a first alternating current (AC) power to the wireless power transceiver based on the first scheme corresponding to the first standard, and a second transmission mode for transmitting a second AC power to the wireless power transceiver based on the second scheme corresponding to the second standard, wherein the controller is further configured to: based on identifying the first scheme, select a first wireless charging frequency which is pre-specified for use with the first scheme among a plurality of wireless charging frequencies, and, based on identifying the second scheme, select a second wireless charging frequency that is pre-specified for use with the second scheme among the plurality of wireless charging frequencies, wherein the second wireless charging frequency is different from the first wireless charging frequency, wherein the controller is further configured to: based on the first wireless charging frequency for the first scheme being selected, control the full bridge circuit to operate in the first transmission mode and convert direct current (DC) power to a-the first (AC) power corresponding to the first wireless charging frequency for the first scheme corresponding to the first standard; based on the second wireless charging frequency for the second scheme being selected, control the full bridge circuit to operate in the second transmission mode and convert the DC power to the second AC power corresponding to the second wireless charging frequency for the second scheme corresponding to the second standard; and control to wirelessly transmit, through the wireless power transceiver, AC power based on the first AC power or the second AC power to the external electronic device, and wherein the controller is further configured to, during the reception mode: control to receive the power from the external electronic device through the wireless power transceiver, control the full bridge circuit to convert the received power to DC power by controlling the plurality of transistors included in the full bridge circuit; and control to provide the converted DC power for the battery of the electronic device, wherein the plurality of transistors of the full bridge circuit comprise a first transistor, a second transistor, a third transistor, and a fourth transistor, wherein the controller is further configured to perform a selective control of the first transistor, the second transistor, the third transistor, and the fourth transistor, for the full bridge circuit to operate in one from among the reception mode, the first transmission mode, and the second transmission mode, and wherein only one full bridge circuit is used in the electronic device, to operate in the reception mode, the first transmission mode, and the second transmission mode; and wherein the first scheme comprises an inductive coupling scheme supporting one from among a Wireless Power Consortium (WPC) standard and a Power Matters Alliance (PMA) standard, and the second scheme comprises a resonance inductive coupling scheme supporting an Alliance for Wireless Power (A4WP) standard.

2. The electronic device of claim 1, wherein the controller is further configured to:
generate a control signal corresponding to one from among the first wireless charging frequency and the second wireless charging frequency, and
control the full bridge circuit in correspondence with the generated control signal, to generate the first AC power or the second AC power having the one from among the first wireless charging frequency and the second wireless charging frequency, respectively.

3. The electronic device of claim 1, wherein the at least two wireless charging schemes comprise a radio wave radiation scheme.

4. The electronic device of claim 1, wherein each of the first transistor, the second transistor, the third transistor, and the fourth transistor is a metal oxide semiconductor field-effect transistor (MOSFET).

5. The electronic device of claim 4, wherein the controller is further configured to:
during one of the first transmission mode or the second transmission mode:
control the first transistor and the fourth transistor to be turned on and control the second transistor and the third transistor to be turned off, during a first period; and
control the first transistor and the fourth transistor to be turned off and control the second transistor and the third transistor to be turned on, during a second period.

6. The electronic device of claim 4, wherein the controller is further configured to:
during the reception mode:
control to receive the power through the first transistor and the fourth transistor, during a third period; and
control to receive the power through the second transistor and the third transistor, during a fourth period.

7. The electronic device of claim 1, further comprising:
a communication unit,
wherein the controller further configured to:
receive, through the communication unit, a second signal from the external electronic device, and
based at least in part on the received second signal, identify the wireless charging scheme to be the second scheme among the first scheme and the second scheme.

8. The electronic device of claim 7, wherein the at least one coil comprises at least two coils, and
wherein a first coil among the at least two coils is configured to transmit and receive wireless power corresponding to the first wireless charging frequency of the first scheme, and a second coil among the at least two coils is configured to transmit and receive wireless power corresponding to the second wireless charging frequency of the second scheme.

9. The electronic device of claim 7, wherein the communication unit is configured to communicate with the external electronic device by a Bluetooth low energy (BLE) communication.

10. The electronic device of claim 9, further comprising:
a first frequency controller configured to receive the signal from the external electronic device; and
a second frequency controller configured to receive the second signal from the external electronic device.

11. The electronic device of claim 9, wherein the electronic device is configured to use the BLE communication when an out-of-band authentication is performed with the external electronic device.

12. The electronic device of claim 9, further comprising:
a buck converter configured to convert the converted DC power to a second DC power; and
a charging circuit configured to transmit the second DC power to the battery.

13. The electronic device of claim 12, wherein the controller is further configured to identify the reception mode based on a load change due to the external electronic device, and, in an absence of the load change, identify the wireless charging scheme for transmitting the AC power based on at least one from among an in-band signal received through the wireless power transceiver and an out-band signal received through the communication unit.

* * * * *